US012709390B2

(12) United States Patent
Huber et al.

(10) Patent No.: US 12,709,390 B2
(45) Date of Patent: Aug. 18, 2026

(54) CARGO DECK, AIRCRAFT AND CENTER GUIDE LOCK FOR AN AIRCRAFT

(71) Applicant: TELAIR INTERNATIONAL GMBH, Miesbach (DE)

(72) Inventors: Thomas Huber, Schliersee (DE); Richard Holzner, Stephanskirchen (DE)

(73) Assignee: TELAIR INTERNATIONAL GMBH, Miesbach (DE)

( * ) Notice: Subject to any disclaimer, the term of this patent is extended or adjusted under 35 U.S.C. 154(b) by 921 days.

(21) Appl. No.: 17/726,898

(22) Filed: Apr. 22, 2022

(65) Prior Publication Data

US 2022/0340280 A1 Oct. 27, 2022

(30) Foreign Application Priority Data

Apr. 23, 2021 (DE) ........................ 102021110523.4

(51) Int. Cl.
*B64D 9/00* (2006.01)
*B64C 1/20* (2006.01)

(52) U.S. Cl.
CPC ................ *B64D 9/003* (2013.01); *B64C 1/20* (2013.01); *B64D 2009/006* (2013.01)

(58) Field of Classification Search
CPC ...... B64C 1/20; B64D 9/003; B64D 2009/006
See application file for complete search history.

(56) References Cited

U.S. PATENT DOCUMENTS

| | | | |
|---|---|---|---|
| 3,693,920 A | 9/1972 | Trautman | |
| 3,906,870 A | 9/1975 | Alberti | |
| 4,077,590 A | 3/1978 | Shorey | |
| 4,929,133 A | 5/1990 | Wiseman | |
| 4,989,809 A | 2/1991 | Arnold | |
| 7,429,157 B2 | 9/2008 | Schulze et al. | |
| 8,925,860 B2 | 1/2015 | Huber et al. | |
| 9,540,106 B2 | 1/2017 | Huber et al. | |
| 10,960,980 B2 | 3/2021 | Huber et al. | |
| 2002/0122709 A1 | 9/2002 | Diamante | |
| 2005/0246057 A1 | 11/2005 | Olin et al. | |
| 2007/0086870 A1 * | 4/2007 | Schulze .................... | B60P 7/13 410/77 |
| 2012/0119052 A1 | 5/2012 | Huber et al. | |
| 2012/0312920 A1 | 12/2012 | Huber et al. | |
| 2015/0367931 A1 | 12/2015 | Cullen et al. | |

(Continued)

FOREIGN PATENT DOCUMENTS

| | | |
|---|---|---|
| DE | 2161735 | 7/1972 |
| DE | 102006048405 | 5/2007 |
| DE | 102018108803 | 9/2019 |

(Continued)

*Primary Examiner* — Amy R Weisberg
*Assistant Examiner* — Philip C Adams
(74) *Attorney, Agent, or Firm* — Barnes & Thornburg LLP

(57) ABSTRACT

A cargo deck for an aircraft having a center plane extending centrally along a longitudinal direction of the cargo deck. The cargo deck includes one or more perforated rails spaced apart from the center plane. The perforated rails may be arranged parallel to the center plane. The cargo deck may also include one or more roller tracks and/or fitting elements arranged relative to the center plane. The cargo deck may also include a one or more center guide locks having one or more guide claws.

14 Claims, 15 Drawing Sheets

(56) References Cited

U.S. PATENT DOCUMENTS

| | | | |
|---|---|---|---|
| 2018/0327097 A1 | 11/2018 | Loose et al. | |
| 2019/0248499 A1 | 8/2019 | Grether et al. | |

FOREIGN PATENT DOCUMENTS

| | | | | |
|---|---|---|---|---|
| DE | 102019124312 | | 3/2021 | |
| EP | 2418145 | | 2/2012 | |
| EP | 2418149 | A2 * | 2/2012 | ............. B64D 9/003 |
| GB | 2431148 | | 4/2007 | |
| WO | WO 2010/149179 | | 12/2010 | |
| WO | WO 2017/081128 | | 3/2017 | |

* cited by examiner

ME
106
11
12
2044.7
[80.5]
2466.34
[97.1]
1533.525
[60.375]
1308.1
[51.5]
1022.35
[40.25]
1168.4
[46]
511.175
[20.125]
165.1
[6.5]
17
1609.725
[63.375]
1682.75
[66.25]
2336.8
[92]
2743.2
[108]
13 a)

LD-PMC = 152 m3 (5,368 ft3) = 18,037 kg
LD-Bulk = 11 m3 (402 ft3) = 1,353 kg b)

LD-AKE = 197 m3 (6,956 ft3) = 23,498 kg
LD-Bulk = 11 m3 (402 ft3) = 1,353 kg c)

MD-AAJ = 454 m3 (16,032 ft3) = 53,973 kg
Note:
AAJ (88x125x96) Container contour shown.
PAG pallet with net would have higher total volume.

d)

MD-AML = 565 m3 (19,952 ft3) = 67,1170 kg e)

MD-PMC Lateral (125x96x114) = 388 m3 (13,702 ft3) = 46,097 kg
Note:
This configuration is only shown as reference. There are additional pallet locks beyond the base set.

f)

MD-PMC Longitudinal (96x125x114) = 314 m3 (11,088 ft3) = 37,359 kg
Note:
This configuration is similar to standard AMA (96x125x96) configuration. Shown here in contoured palletized mode up to 114 inches.

g)

MD-PZA Longitudinal (125x196x114) = max.
8 positions

Fig. 17 h)

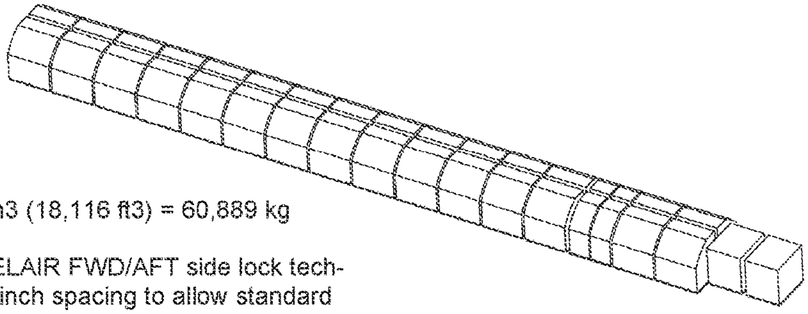

MD-HCU-6E (CRAF) = 513 m3 (18,116 ft3) = 60,889 kg
Note:
ULDs are proposed to use TELAIR FWD/AFT side lock technology. Configuration uses 2 inch spacing to allow standard 110 side lock spacings.
System configuration can also house T2 trains and T3 trains in the longitudinal direction.

i)

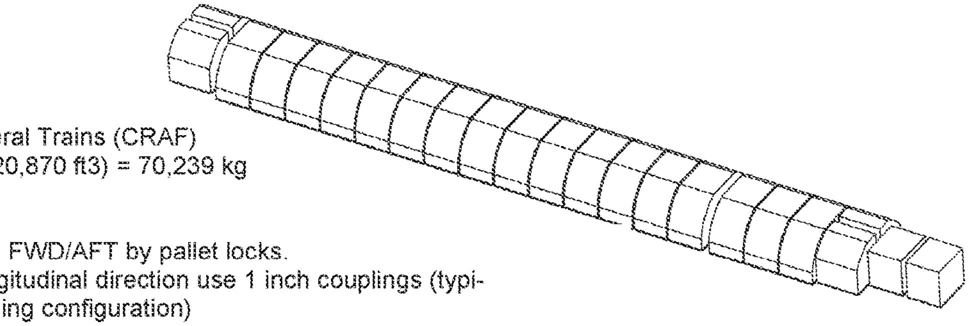

MD-T2 Lateral Trains (CRAF)
= 591 m3 (20,870 ft3) = 70,239 kg

Note:
ULDs are locked in FWD/AFT by pallet locks.
T2 trains in the longitudinal direction use 1 inch couplings (typically HMMWV loading configuration)
Flipper lugs need not latch (Pallet locks will provide vertical limitation).

j)

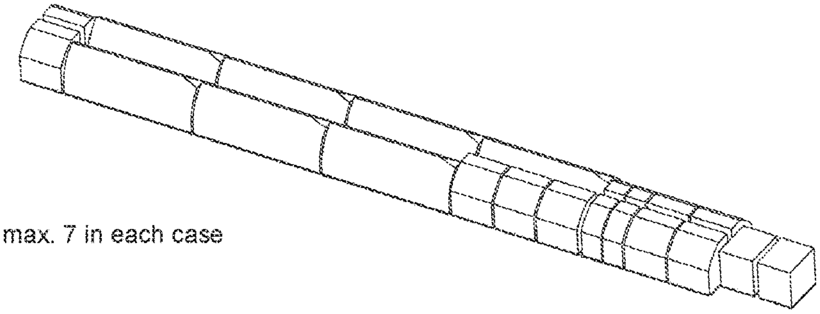

MD-T3 Trains (CRAF) - max. 7 in each case

Fig. 17 k)

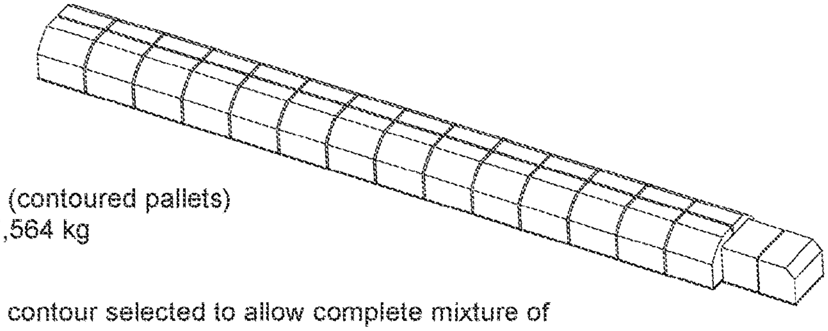

MD-All-PMC Configuration (contoured pallets)
= 569 m3 (20,094 ft3) = 67,564 kg

Note:
Standard 96x125x114 inch contour selected to allow complete mixture of positions.
Changes to contour 96x125x118 inch high at central cylinder would slightly increase volume, but in this case would require 2 contours.

l)

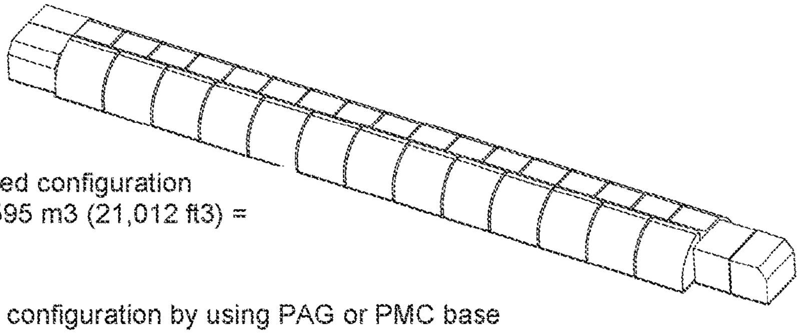

MD-PAG-PMC Asymmetric mixed configuration
(max. volume configuration) = 595 m3 (21,012 ft3) = 70,621 kg Note:
This is a high-volume (express) configuration by using PAG or PMC base plate combination,
- up to 21 PMC with 13 PAG
- or 17 PMC with 17 PAG
- or up to 34 PAG (if 88 inch side locks are also installed)

m)

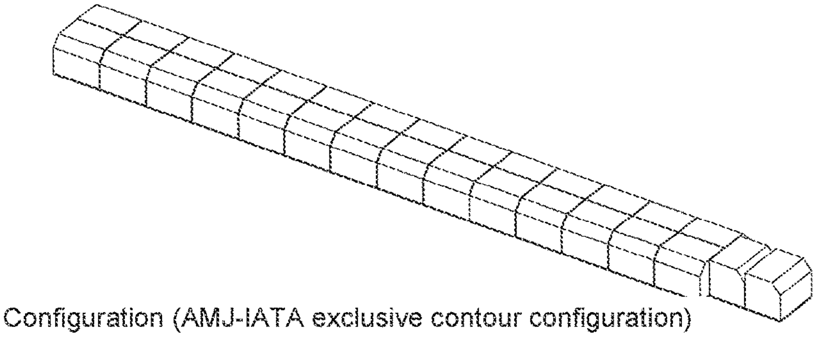

MD-(Solely) AMJ Configuration (AMJ-IATA exclusive contour configuration)
= 542 m3 (19,140 ft3) = 64,404 kg

CARGO DECK, AIRCRAFT AND CENTER GUIDE LOCK FOR AN AIRCRAFT

CROSS REFERENCE TO RELATED APPLICATIONS

This application claims priority to German Patent Application No. 10 2021 110 523.4, filed Apr. 23, 2021. The disclosure set forth in the referenced application is incorporated herein by reference in its entirety.

FIELD OF THE DISCLOSURE

The invention relates to a cargo deck for an aircraft.

BACKGROUND

Aircraft are developed for different purposes, e.g. as passenger aircraft or cargo aircraft, but are also modified and used for different purposes in the course of their service life. Aircraft designed for passenger transport are mainly used for the transport of cargo or cargo items after an appropriate period of use. The aircraft may generally have a main deck and a lower deck in which cargo is carried while the aircraft is in use for passenger transport.

When transporting cargo in aircraft, cargo items, e.g. containers or pallets ("Unit Load Devices—ULDs") are often used, which are cuboid or trapezoidal or have a shape with a special outer contour. Such containers or pallets can be loaded longitudinally or transversely, depending on the aircraft's cargo space. Thus, for containers and pallets, for example for civil aviation, there are the following standard sizes relevant in the context of this application. The following standardized dimensions of the containers and pallets are each given in length x width x height.

Containers and pallets ("ULDs") are classified by three letters, as is generally known, according to a regulation of the "International Air Transport Association" (IATA). Only the most important ones are explained below:

- The first letter defines the type of cargo. The letter A indicates a container or the letter P indicates a pallet;
- The second letter provides information about the floor size, i.e. the base area of the cargo, and
- The third letter describes the contour or the type of construction of the cargo.

Containers and pallets for transport in the main deck of an aircraft have essentially the following standardized dimensions:

- 223.5×317.5×243.8 cm (88×125×96 inches). These dimensions apply to AAJ containers and PAG pallets;
- 223.5×317.5×208.2 cm (88×125×82 inches). Such dimensions are used for example for AAA, AAC, AAY and AAZ containers and PAG pallets;
- 243.8×317.5×243.8 cm (96×125×96 inches). Such cargo items are known as AMA and AMJ containers and PMC pallets;
- 243.8×497.8 cm (96×196 inches) or 243.8×605.7 cm (96×238.5 inches). These dimensions correspond to the footprint of pallets with a specific contour resulting, for example, from the contour of an engine or vehicle or special cargo. Such pallets are conventionally referred to as PRA or PGA pallets;
- 223.5×274.3 cm (88×108 inches) and 137.1×223.5 cm (54×88 inches). These dimensions correspond to the footprint of pallets with a specific contour determined by military goods, e.g. cargo or ISU containers. Such pallets are called HCU-6E, PBN or HCU-12E pallets.

Containers and pallets for transport in the lower deck of an aircraft have essentially the following standardized dimensions:

- The following dimensions correspond to the footprint of containers or pallets with a specific contour. The contour is determined by a contour of the lower deck or the cargo hold contour of the aircraft and/or by a required loading height for specific cargo and/or by an already existing standardized cargo piece contour.
- 223.5×317.5 cm (88×125 inches) or 243.8×317.5 cm (96×125 inches).

Pallets with such footprints are called PAG pallets or PMC pallets;

- 153.4×156.2 cm (60.4×61.5 inches). This footprint applies to AKH and AKG containers as well as PKC pallets;
- 156.2×243.8 cm (61.5×96 inches). This corresponds to the footprint of PNA pallets;
- 153.4×243.8 cm (60.4×96 inches). This corresponds to the footprint of PQA pallets; and
- 153.4×119.4 cm (60.4×47 inches). This corresponds to the footprint of PPA pallets.

To hold and guide such standardized and also non-standardized cargo items, functional units mounted on the cargo deck are used, e.g. locks, side guides, etc.

For optimum utilization of a cargo hold, it is necessary to offer a wide range of configuration options, with fast conversion of the cargo deck being a high priority. Suitable functional units must be quick and easy to attach and reconfigure, since the costs of operating such aircraft are very high. Furthermore, the configuration or reconfiguration should be very easy to perform, since the personnel performing these reconfigurations often have had no or only poor training for the cargo decks used. In addition, the cargo deck equipment, especially the functional units, must be very robust, as they are subjected to very high loads and gentle handling cannot be demanded due to the high time pressure during loading and unloading. A cargo deck is often exposed to wetness, high temperature differences, dust and other rough influences. A defective cargo deck—even just a defective functional element of the cargo deck—can mean that the aircraft in question cannot be used for several days. Such a failure is very expensive.

It is known that the loading of the cargo deck with the cargo system has a significant impact on the total weight of the aircraft.

Ultimately, the aim is always to provide an optimally loadable cargo deck with a high degree of functionality, while keeping the weight as low as possible.

SUMMARY

It is the object of the present invention to provide an improved cargo deck. In particular, the aim is to provide a highly functional cargo deck that has a very low weight and at the same time allows a variety of different loading configurations.

The object is solved by the subject matter according to the present disclosure.

In particular, the object is solved by a cargo deck for an aircraft having a center plane extending centrally along the longitudinal direction of the cargo deck. The cargo deck may comprise:

- at least one (first) perforated rail, in particular seat rail, which is preferably arranged parallel to the center plane in a range between 10 and 20 cm, in particular between 14 and 19 cm, spaced from the center plane; and/or at least one (second) perforated rail, which is preferably arranged parallel to the center plane in a range between 113 and 120 cm, in particular between 115 and 119 cm, spaced from the center plane; and/or at least one (third) perforated rail, which is preferably arranged parallel to the center plane in a range between 125 and 135 cm, in particular between 127 and 134 cm, spaced from the center plane; and/or at least one (fourth) perforated rail, which is preferably arranged parallel to the center plane in a range between 240 and 250 cm, in particular between 243 and 248 cm, spaced from the center plane.

A core aspect of the invention is therefore to provide the minimum possible number of perforated rails on the cargo deck, wherein these perforated rails stiffen the cargo deck on one side and provide a link, in particular a perforated rail link, on the other side in order to anchor or fasten functional units. The fastening of functional units in perforated rails, for example seat rails, is sufficiently known in the art. For the purposes of the present invention, perforated rails are understood to be rails which are dimensioned such that they can extend over a plurality of cross members of an aircraft. Preferably, these perforated rails are attached to the cross members to stiffen the cargo deck. According to the invention, the perforated rails have a continuous perforated rail link or interrupted sections of perforated rail links.

Mounting lines are defined by the perforated rail links. In one embodiment, the mounting line runs through a plane of symmetry of the perforated rail link in the longitudinal direction. In one embodiment, the mounting line corresponds to this plane of symmetry.

For the purposes of the present invention, a center plane is understood to be a plane defined by the X and Z-directions of the aircraft, wherein said center plane divides the cargo deck into two equal-sized, at least partially symmetrical sections. Preferably, the center plane contains the zero buttock line (BL0) of the aircraft.

By positioning the perforated rail at the locations or areas indicated above, it is possible to equip an aircraft deck with a minimum number of perforated rails, for example less than nine or even less than eight perforated rails per segment of the cargo deck (across the entire width). At the same time, diverse loading configurations of containers and pallets, as enumerated at the beginning, are supported. This means that the ULDs can be arranged very efficiently in the cargo hold, with the perforated rails providing holding points for the functional units. In particular, the second and third perforated rails are arranged in such a way that they allow the ULDs to be secured in the longitudinal direction (X-direction).

In one embodiment, the perforated rails are positioned in at least one segment of the cargo deck as follows:

First perforated rail: mounting line spaced approx. 16 or 17 cm from center plane; and/or Second perforated rail: mounting line spaced approx. 117 cm from the center plane; and/or Third perforated rail: mounting line spaced approx. 131 cm from the center plane; and/or Fourth perforated rail: mounting line spaced approx. 247 cm from the center plane.

The aforementioned positioning of the perforated rails is particularly advantageous if, in addition to the perforated rails, roller tracks are provided which are firmly connected, in particular bolted, to the supporting structure of the aircraft, in particular the cross members.

In an embodiment where no or very few fixedly installed roller tracks are provided, the perforated rails are arranged with respect to the center planes as follows:

First perforated rail: Approx. 15-32 cm, in particular approx. 18-30 cm, e.g. to 21 cm or 23 cm; and/or Second perforated rail: Approx. 67-90 cm, in particular approx. 69-76 cm, e.g. to 72 cm; and/or Third perforated rail: Approx. 120-130 cm, in particular approx. 120-126.5 cm, e.g. to 120 cm or 123 cm; and/or;

Fourth perforated rail: Approx. 170-180 cm, in particular approx. 171-178 cm, e.g. to 173.5 cm; and/or Fifth perforated rail: Approx. 220-230 cm, in particular approx. 221-228 cm, e.g. to 224 cm; and/or Sixth perforated rail: Approx. 245-260 cm, in particular approx. 247-259 cm, e.g. to 224 cm; and/or Seventh perforated rail: Approx. 255-275 cm, in particular approx. 260-275 cm, for example, to 274 cm or 275 cm.

Removable roller tracks can then be attached to some of these perforated rails. In one embodiment, the first to the sixth perforated rails are arranged at the aforementioned positions in at least one segment.

In one embodiment, at least one pair of the second and one pair of the third perforated rails are provided in a segment of the cargo deck at the positions indicated above. As explained above, the perforated rails positioned there allow the ULDs to be particularly well secured in the X-direction of the aircraft. Additionally, a pair of the first perforated rails may be positioned in said segment at the predetermined positions. In a preferred embodiment, all of said perforated rails, namely the first through fourth perforated rails or the first through seventh perforated rails (not fixed roller tracks) are arranged in at least one segment of the aircraft at the positions described above to achieve an optimal cargo deck.

In one embodiment, roller tracks are provided to further reinforce the structure of the cargo deck and to accommodate other functional units in addition to the rollers to easily convey the ULDs.

The cargo deck may include the following roller tracks:

at least one (first) roller track, which is preferably arranged parallel to the center plane in a range between 44 and 57 cm, in particular between 48 and 55 cm, spaced from the center plane; and/or at least one (second) roller track, which is preferably arranged parallel to the center plane in a range between 95 and 110 cm, in particular between 98 and 105 cm, spaced from the center plane; and/or at least one (third) roller track, which is preferably arranged parallel to the center plane in a range between 145 and 160 cm, in particular between 150 and 156 cm, spaced from the center plane; and/or at least one (fourth) roller track, which is preferably arranged parallel to the center plane in a range between 200 and 210 cm, in particular between 200 and 208 cm, spaced from the center plane.

In one embodiment, at least the U-profiles supporting the rollers of the roller tracks are located within the areas indicated above. Mounting lines can also be defined with respect to the roller tracks, with at least these mounting lines being located within the areas indicated above. A mounting line or mounting plane of a roller track can be defined to be centered between the side walls of the U-section of the roller track.

In one embodiment, the roller tracks are positioned in at least one segment of the cargo deck as follows:

first roller track: mounting line spaced approx. 50 or 51 cm from the center plane; and/or second roller track: mounting line spaced approx. 102 cm from the center plane; and/or third roller track: mounting line spaced approx. 153 cm from the center plane; and/or fourth roller track: mounting line spaced approx. 204 to 205 cm from the center plane.

In one embodiment, the roller tracks are firmly attached to cross members, in particular riveted and/or bolted to them.

In one embodiment, at least one segment of the cargo deck comprises exactly eight roller tracks. Preferably, these eight roller tracks are all located at the positions indicated above. In this case, pairs of first, second, third and fourth roller tracks, respectively, can be provided to provide the eight roller tracks.

In a (further) embodiment, exactly eight perforated rails are provided in one or in the segment at the positions of the perforated rails described at the beginning. Again, the perforated rails may be provided in pairs as first, second, third and fourth pairs of perforated rails. Alternatively, in the embodiment without fixed roller tracks, exactly 12 (alternative side guide) or exactly 14 perforated rails can be provided in at least one segment. The perforated rails then assume the stiffening function provided at least in part by the fixed roller tracks.

In another embodiment, a further perforated rail is arranged in the segment along the center plane, resulting in a total of exactly nine or exactly 15 perforated rails.

Said configurations may be provided in one or more segments of the cargo deck, as previously explained.

In one embodiment, fitting elements are additionally provided at predetermined positions or in predetermined areas. According to the invention, fitting elements are designed to be connected (directly) to cross members of the aircraft. Fitting elements may have receiving areas to attach functional elements to the cargo deck. Preferably, the fitting elements are designed in such a way that loads applied via the functional units are transferred directly into the structure of the aircraft.

In one embodiment, the receiving areas can be perforated rail links, as are known in connection with perforated or seat rails. A corresponding fitting element then has at least two, preferably at least three, holes of a corresponding perforated rail link. In one embodiment, the length of a perforated rail link of a corresponding fitting element is limited to a maximum of 20 holes, in particular to a maximum of 15 holes.

The cargo deck may include the following fitting elements:

at least one (first) fitting element mounted at a distance of between 155 and 165 cm, in particular between 157 and 163 cm, from the center plane; and/or at least one (second) fitting element mounted, preferably immediately adjacent to the first fitting element, at a distance of between 163 and 175 cm, in particular between 165 and 170 cm, from the center plane; and/or at least one (third) fitting element mounted at a distance of between 225 and 240 cm, in particular between 228 and 236 cm, from the center plane; and/or at least one (fourth) fitting element mounted at a distance of between 260 and 280 cm, in particular between 265 and 276 cm, from the center plane.

The fitting elements are used, as already described, to attach functional units to the cargo deck. Compared to perforated rails, they have a significantly lower weight, so that the weight of the cargo deck can be further reduced by using the fitting elements, especially at the positions described above. Compared with the roller tracks and the perforated rails, however, the fitting elements have the disadvantage that they do not stiffen the structure of the cargo deck. In this respect, according to the invention, a configuration is provided in which the requirement for stiffness and weight is optimized.

In accordance with the definition for the perforated rails, mounting lines or a mounting plane can also be defined for the fitting elements. The above-mentioned area or position specifications can be understood in such a way that at least the mounting line of the fitting elements is located in the said areas or at the said positions.

In one embodiment, there is:

a mounting line of the at least one first fitting element spaced approx. 161 cm from the center plane; and/or a mounting line of the at least one second fitting element spaced 168 cm from the center plane; and/or a mounting line of the at least one third fitting element spaced 234 cm from the center plane; and/or a mounting line of the at least one fourth fitting element spaced approx. 275 cm from the center plane.

In one embodiment, a pair of fitting elements is arranged alternately with respect to a perforated rail. This pair of fitting elements may be the third and fourth fitting elements. Thus, the third and fourth fitting elements may flank a perforated rail. This perforated rail may be the fourth perforated rail. Generally, this arrangement is preferred at the side edges near the outer skin of the aircraft. Side guides are arranged at these locations. The particular constellation which ultimately provides three attachment points or areas, for example in the form of perforated rail tracks, is suitable for attaching such side guides. In earlier systems, at least two perforated rails were usually provided here. The additional weight of a further perforated rail can be dispensed with by the design according to the invention. In one embodiment, the side guide comprises a guide rail that connects a plurality of frames that are attached at the attachment points. In this respect, the side guide rail together with the perforated rail stiffens the cargo deck. Not least for this reason, the arrangement of a further perforated rail can be dispensed with.

In one embodiment, pairs of first or second or third or fourth roller tracks can be arranged symmetrically to the center plane in at least one segment. This means, for example, that a port-side first roller track is arranged symmetrically to a right-side first roller track. The center plane forms the mirror plane. The same can apply to the remaining pairs of roller tracks. The perforated rails can also be arranged symmetrically in pairs. A corresponding symmetrical arrangement may be provided in at least one segment or over wide sections of the cargo deck.

In one embodiment, at least some of the fitting elements are arranged in pairs symmetrically about the center plane. This may be a pair of the first fitting elements and/or a pair of the second fitting elements, and/or a pair of the third fitting elements and/or a pair of the fourth fitting elements.

The cargo deck may include center guide locks generally adapted to provide two substantially parallel attachment tracks (each track including a series of like ULDs) in at least one segment of the cargo deck. In one embodiment, the center guide locks are provided with at least one side guide claw, and are alternately arranged transversely—along the Y-direction—on the cargo deck such that stop surfaces of the side guide claws face in opposite directions. Corresponding center guide locks are usually arranged along the center plane.

In a (further) embodiment, at least a first and a second center guide lock are arranged such that a/the stop surface of the first center guide lock faces or is aligned in an opposite direction than a/the stop surface of the second center guide lock, wherein a first plane spanned by the stop surface of the first center guide lock is spaced apart from a second plane spanned by the stop surface of the second center guide lock by between 2.5 cm (1 inch) and 10 cm (4 inches). Thus, boundaries can be created on the port side (e.g., along the first plane) and starboard side (e.g., along the second plane) for conveying tracks that extend on the port and starboard sides of the arranged center guide locks. The spacing of these boundaries can be kept very small due to the alternating arrangement of the center guide locks, so that optimal utilization of the cargo deck can be achieved. In particular, space can be saved by this approach in order to provide side aisles for the loading personnel and/or to enable particularly favorable loading configurations.

The distance between the first and second planes can be about 3 cm (1 ¾ inches) or about 9 cm (3.6 inches).

In one embodiment, the stop surfaces have locking lugs and/or securing plates or securing claws (so-called "blades") that project beyond the stop surface (in the Y-direction). In the opposite arrangement explained, these projections face in opposite directions.

In one embodiment, the stop surfaces can be folded down, optionally with projections (jointly referred to as lock claws), in such a way that, in a folded-down state, these come to rest in an area outside the frame (in front of or behind the frame). Preferably, the first and second center locks are arranged in such a way that the (essentially) same lock claws fold down in opposite directions.

In a (further) embodiment, at least one, preferably both, lock claws with the stop surfaces spanning the first and second planes is/are arranged to be displaceable along the longitudinal direction of the frame of the respective center lock. For example, the respective lock claw may be arranged to be displaceable by up to 5 cm (about two inches). In one embodiment, a spacing of approx. 2.5 cm and of approx. 9 cm is thus adjustable (corresponding to a respective displacement of approx. 3.25 cm), wherein preferably a locking of the lock claws at the respective position can be effected. Thus, additional advantageous loading configurations can be provided. The displaceability can be achieved, for example, by providing a carriage, wherein the respective lock claw is arranged on the carriage and the carriage is fixable to the frame at different positions.

According to the invention, advantageous cargo deck configurations can be achieved when (similar or identical) center guide locks are provided sequentially in opposing arrangements.

On the one hand, this particular form of arrangement has the advantage that guide planes, which are very close to each other, can be spanned by the center guide lock, in particular by the side guide claws. For example, it is possible to make the side guide claw relatively robust and at the same time achieve a distance of less than 5 cm, in particular of less than 4 cm, for example of 1 inch. Thus, the ULDs can be loaded extremely close to each other (viewed in the Y-direction).

In one embodiment, the center guide locks may have differing claws or arms at their ends. The alternating alignment can thus provide different functions in the two attachment tracks.

In one embodiment, some or all of the aforementioned center guide locks are of asymmetrical design (on a transverse plane transverse to the longitudinal direction of the frame). For example, they can have a frame, with this frame extending in the longitudinal direction. A guide lock which can be folded away towards the front can be arranged at one end of this frame. Folding away a guide lock towards the front has the advantage that substantial components of the guide claw come to lie in an area which lies outside the frame when folding away, so that these parts can be dimensioned to be correspondingly more voluminous. For example, larger stop surfaces can be provided which extend transversely to the longitudinal direction of the frame and alternately project beyond it. In one embodiment, different claws are provided at both ends of the frames. For example, there may be a side guide claw at one end of the frame and a securing claw at the other end of the frame. According to the invention, one of the two claws or both claws may be hinged. In a preferred exemplary embodiment, both claws are foldable from a working position to a rest position. In one embodiment, the fold-down mechanisms may differ in that one of the claws, for example the side guide claw, comes to rest at least partially (as already explained) outside the frame in the rest position and the other claw, for example the securing claw, comes to rest (at least partially) in an area inside the frame in the rest position.

In one embodiment, the two different locking claws each rotate about a separate axis of rotation to reach the rest position. The fold-down mechanism from the working position to the rest position can differ in that, when viewed from the same direction, there is one clockwise rotation and one counterclockwise rotation.

In a (further) embodiment, the locking claws differ in terms of their specific design. For example, the securing claw can have an L-profile that is dimensioned so that it has a width that is less than the clear width of the frame section in which the securing claw comes to rest in the rest position. The side guide claw can have a so-called Z-lug, which is mounted in a rotatably movable manner on the stop surface in such a way that it folds away from its initial position when cargo items pass by, into a position that allows the cargo items to be guided laterally along the stop surface.

In one embodiment, the center guide locks described above are anchored either in the pair of first perforated rails already explained or in a first perforated rail and a further perforated rail extending along the center plane.

To provide the different functions, for example, a securing claw can be provided at one end of the center guide lock, which is particularly suitable for locking loaded pallets in such a way that loads can be received in the X-direction ("forward", "aft"). In one embodiment, the side guide claw already described is added at the opposite end. Preferably, at least the securing claw is designed to be downwardly foldable in such a way that it can be brought from a rest position into a holding position for fixing the pallets. In combination with the described side guide claw, it is possible to insert cargo in two loading lanes or fastening lanes extending parallel to each other, with the cargo first being guided along the stop surfaces of the alternately aligned side guide claws. When the pallets reach their final position, the securing claws can be folded up so that they lock the pallets in the X-direction.

In one embodiment, the center guide locks are designed and arranged or arrangeable at least in one segment in such a way that stop surfaces of the side guide claws limit a center aisle in one configuration and/or arrangement. In other words, the center guide locks can be arranged or designed in such a way that a center aisle is formed between the loading tracks. Preferably, this center aisle is configured such that loading personnel can move within it. In conjunction with the hinged securing claws described above, this makes it possible to load the cargo first and then reach the individual center guide locks via the center aisle so that the ULDs can be secured in a second step. Compared to conventional cargo loading systems, where such aisles are always provided at the side areas, this results in space savings as well as a much more convenient center aisle to walk on. Furthermore, the loading time can be reduced because the ULDs can be secured alternately from one aisle, namely the center aisle, and two aisles arranged in the outer area do not have to be walked down separately.

In this configuration or arrangement, the stop surfaces of the side guide claws can be spaced at least 15 cm, in particular at least 20 cm, preferably approx. 21 cm, from the center plane. Assuming an embodiment in which the center guide locks are arranged in alternating alignment, this thus results in a center aisle of at least 30 or at least 40 or at least 42 cm. The center aisle can therefore be walked over comfortably.

In one embodiment, at least one of the center guide locks comprises a fold-down center guide claw having two alternating stop surfaces. Thus, in addition to the side guide claw, a center guide claw may be provided, for example, located in the area of the center plane. In one configuration, this center guide claw can delimit two cargo conveying tracks. Furthermore, a side guide claw and a securing claw can be provided at each end. The side guide claw and the securing claw may have stop surfaces that are clearly spaced apart from each other, for example at least 30 cm apart, when the claws are in an erected state. In at least one embodiment, the stop surfaces face in opposite directions so that they can abut ULDs in a starboard-side conveying track as well as in a port-side conveying track.

The object mentioned at the beginning is further solved by an aircraft having a cargo deck, wherein the cargo deck is an embodiment as described above.

Furthermore, the above-mentioned object is solved by a center guide lock. The center guide lock may be a center guide lock particularly suitable for use in conjunction with the cargo deck already described. It may have some or all of the features already described in connection with various embodiments of the center guide lock.

In one embodiment, the center guide lock comprises:

- a frame;
- a securing claw mounted in the frame, in particular in such a way that it can be folded down;
- a side securing claw mounted in the frame, in particular in such a way that it can be folded down;

wherein the stop surfaces of the side guide claw are spaced apart from each other by at least 30 cm, in particular at least 40 cm, preferably approx. 43 cm, in an erected position and are oriented in opposite directions.

As already explained, the center guide lock can be used to limit parallel conveying tracks. Furthermore, it can be used to allow a variety of different cargo loading configurations. Finally, the center guide lock can further offer the (generous) center aisle already explained to ensure effective loading and unloading, especially securing of the cargo.

In one embodiment, the center guide lock comprises a center guide claw hingedly mounted in the frame and having a first stop surface and a second stop surface oriented in opposite directions. Preferably, the stop surfaces of the guide claw are spaced apart by at least 1 cm, in particular at least 2 cm, for example approx. 2.5 cm. In one embodiment, these stop surfaces of the center guide claw are spaced no further than 10 cm apart, in particular no further than 5 cm apart.

In one embodiment, the center guide claw is arranged in a centered manner within the frame.

By using different claws, namely the securing claw and the side guide claw, the center guide lock as such is of asymmetrical design. In one embodiment, the securing claw is located at one end of the frame and the guide claw is located at the other end of the frame. As previously explained, the securing claw and the guide claw may differ based on their specific design and function. For example, both the securing claw and the guide claw may be downwardly foldable from a working position to a rest position. As already explained above, the securing claw may be substantially within the frame in its rest position, with the guide claw being at least partially in an area that is outside the frame in its rest position. As previously explained, the directions of rotation of the claws to reach the rest position may differ from the working position. The securing claw can have the L-profile already explained and the side guide claw can have the Z-lug already explained.

BRIEF DESCRIPTION OF THE DRAWINGS

The invention is explained in more detail below with reference to the accompanying drawings. The embodiments shown represent examples of how the aircraft according to the invention and the cargo container according to the invention may be configured.

The drawings show as follows.

In the following description, the same reference numbers are used for identical parts and parts with the same effect.

DETAILED DESCRIPTION

Figure 1:
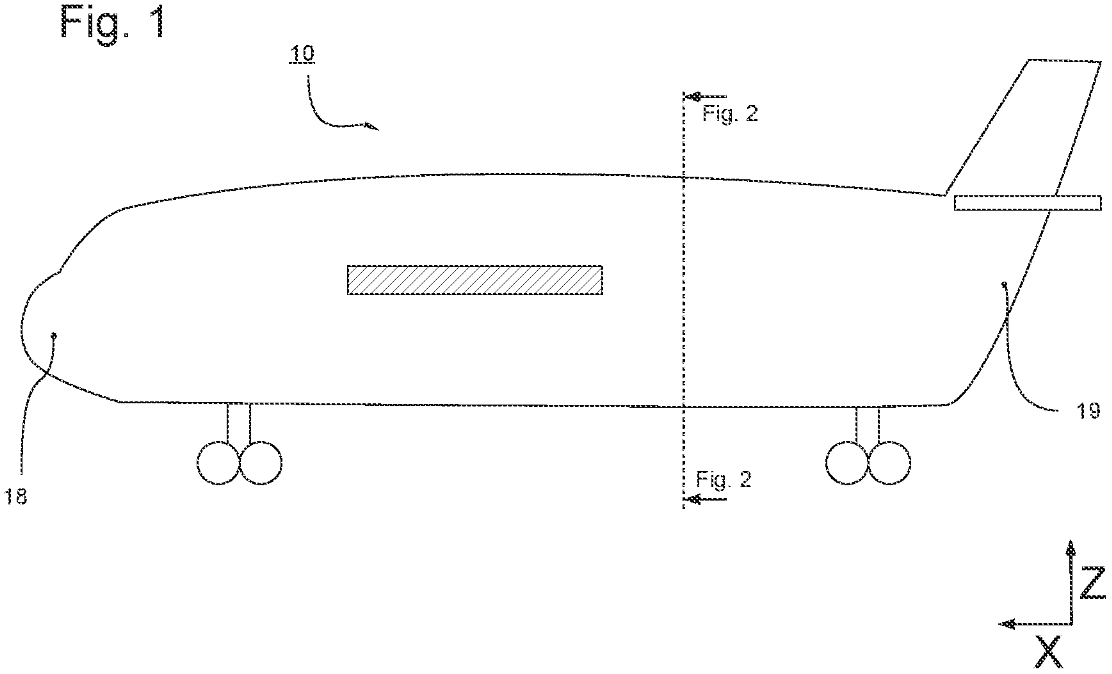
FIG. 1 shows a schematic representation of an aircraft.

FIG. 1 shows a side view of an aircraft 10. The aircraft or its fuselage 11 extends in a longitudinal direction from the nose 18 to the tail 19. In the following description, this longitudinal direction is referred to as the X-direction. The direction extending vertically is referred to as the Z-direction, and the direction perpendicular to the respective direction vector is referred to as the Y-direction.

Figure 2:
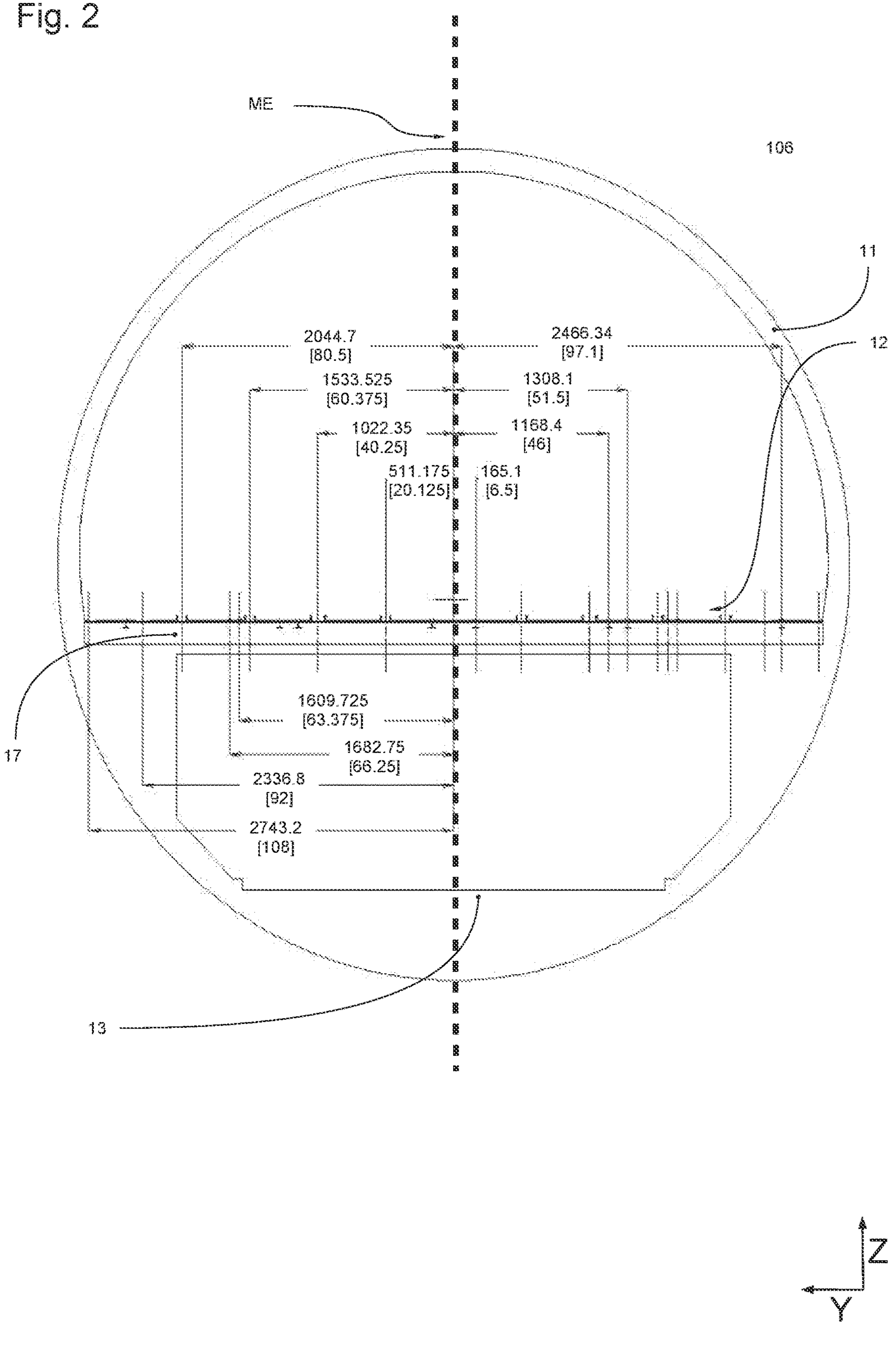
FIG. 2 shows a section through the aircraft of FIG. 1 with the cargo deck according to the invention.

FIG. 2 shows a section through the aircraft 10 according to FIG. 1. The section is a cross-section along a plane defined by the Z and Y-directions.

Since the aircraft 10 is a cargo aircraft, e.g., the A350F, the section shows two cargo compartments; an upper cargo compartment bounded downwardly by the upper deck 12 (hereinafter cargo deck 12) and a lower deck 13. The cargo deck 12 rests on a plurality of cross members 17, with one of these cross members being shown schematically in FIG. 2. In this embodiment, the cargo deck 12 has the dimensions of the main deck of an A350.

Perforated rails 20, roller tracks 30 and fitting elements 40 are arranged symmetrically at predetermined intervals on the cargo deck 12. A plane extending along the longitudinal direction (X-direction) and Z-direction, namely the center plane ME, forms the symmetry plane for the arrangement of said components.

The positions of the individual perforated rails 20, roller tracks 30 and fitting elements 40 are also indicated starting from this center plane ME. The distances refer to a mounting line or mounting plane MT, which will be explained below (see, for example, FIG. 6 and FIG. 7).

In a preferred configuration, the perforated rails 20 are arranged at the positions specified by the dimensioning in the upper right quadrant of FIG. 2. The number given there indicates millimeter values, with inch values given in square brackets below.

The dimensions in the upper left quadrant of FIG. 2 provide distances of the roller tracks 30 from the center plane ME. A total of four roller tracks are provided in the configuration shown in accordance with the invention.

The dimensioning in the lower left quadrant specifies the distances between the mounting line MT of the fitting elements 40 and the center plane ME.

Figure 3:
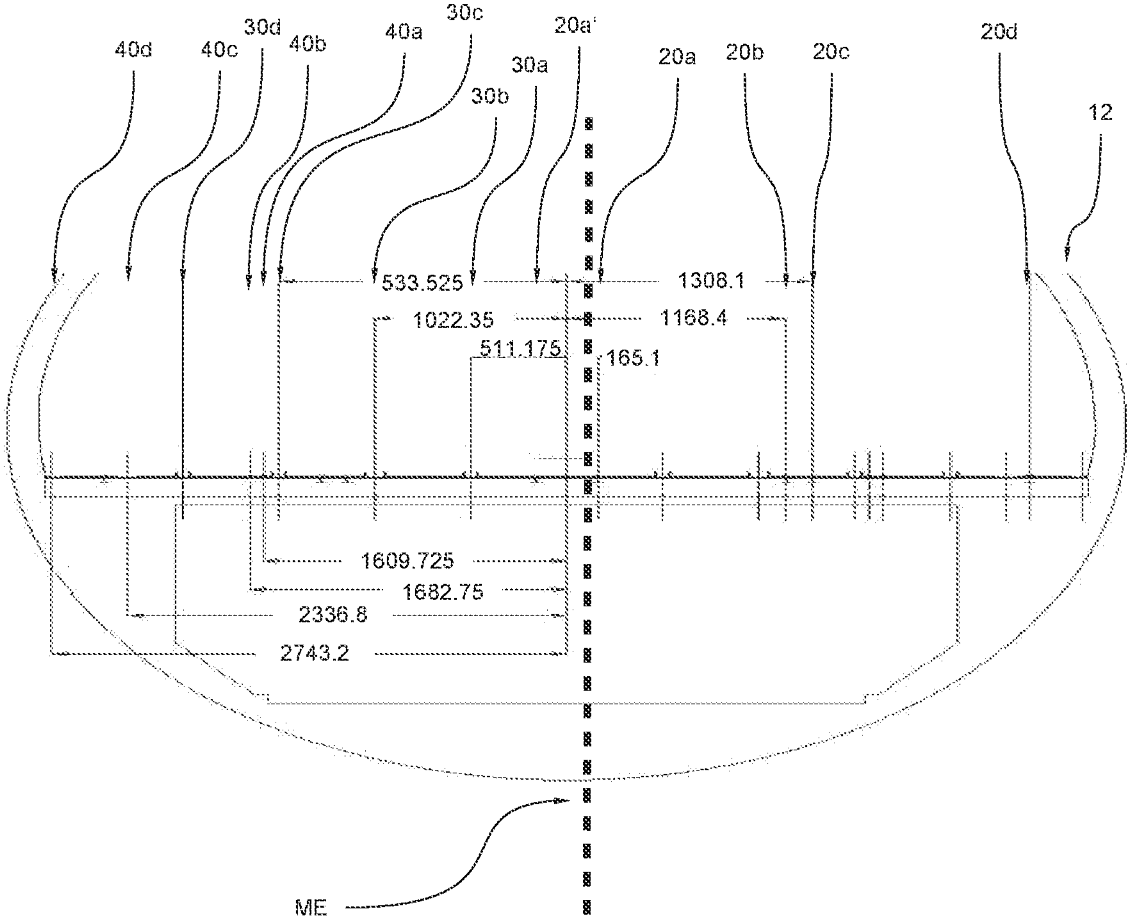
FIG. 3 shows a schematic partial view of FIG. 2.

FIG. 3 illustrates the specific configuration. A core feature of the invention is that the very small number of perforated rails 20 and roller tracks 30 creates an inherently rigid cargo deck 12 on which ULDs can be arranged in a highly functional manner.

For this purpose, exactly four roller tracks 30, namely the first roller track 30*a*, the second roller track 30*b*, the third roller track 30*c* and the fourth roller track 30*d*, are provided on the port and starboard sides of the center plane ME. Likewise, four perforated rails 20 are provided in a row arrangement on the port side and starboard side, respectively. These are a first perforated rail 20*a*, a second perforated rail 20*b*, a third perforated rail 20*c* arranged close to the second perforated rail 20*b*, and an outer fourth perforated rail 20*d*.

Furthermore, fitting elements 40 are provided on imaginary lines along the longitudinal direction (X-direction) of the aircraft. In the embodiment shown in FIG. 3, there are four such lines with fitting elements 40 on each side. These are a first fitting element 40*a*, a second fitting element 40*b* arranged close to it, a third fitting element 40*c* and a fourth fitting element 40*d*.

Figure 4:
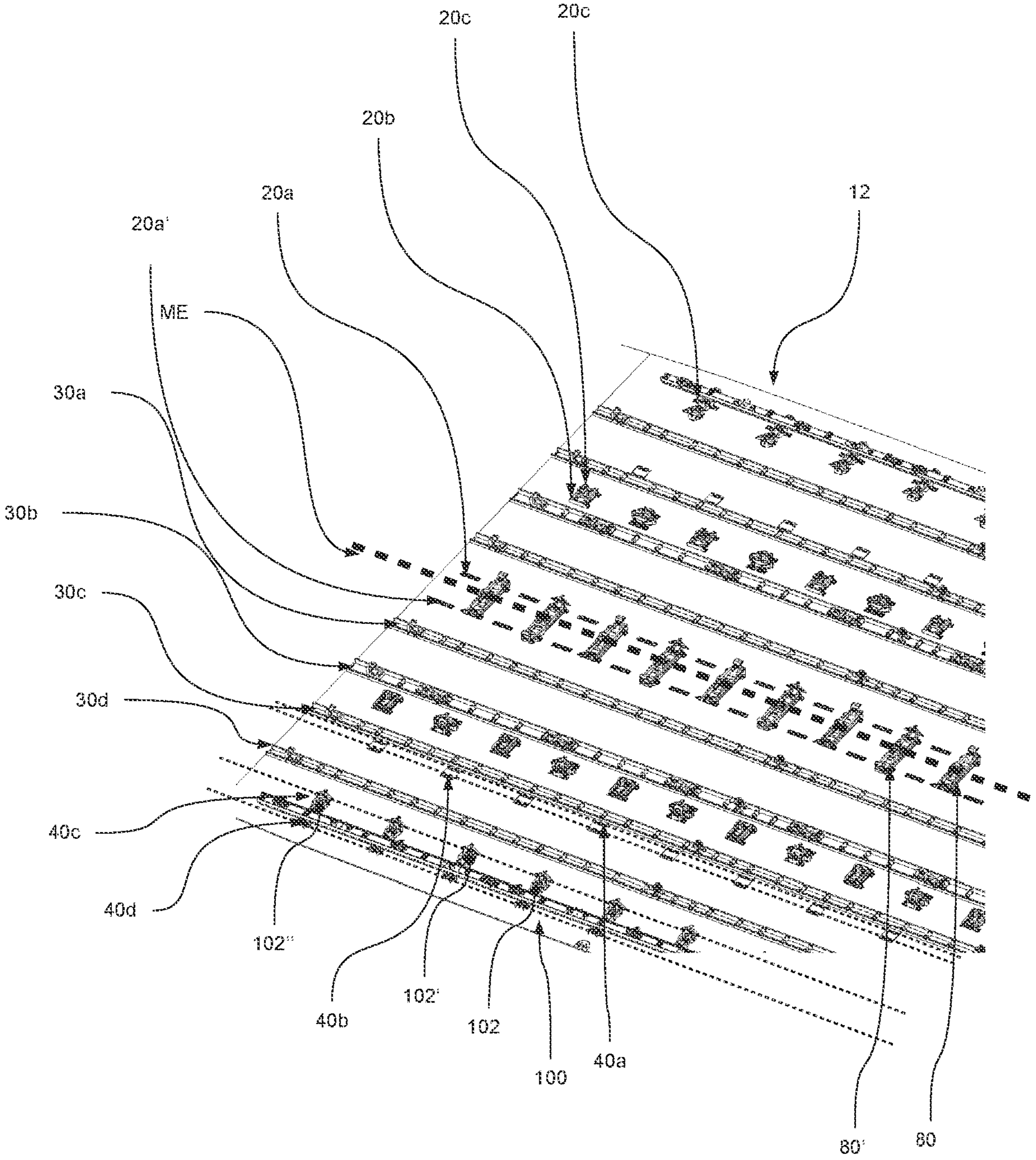
FIG. 4 shows a top perspective view of a first configuration of a cargo deck according to the invention, comprising perforated rails, roller tracks, fitting elements and various functional units arranged on the cargo deck.

FIG. 4 shows a perspective view of the cargo deck 12 according to the invention. In this view, the roller tracks 30*a*, 30*b*, 30*c*, 30*d* reinforcing the structure can be clearly seen. These roller tracks are arranged symmetrically with respect to the center plane, as explained earlier. In addition to the rollers, they contain roller drive units, so-called PDUs, as well as X-locks. Such X-locks secure the cargo in the X-direction. The arrangement of such locks within the roller tracks 30*a*, 30*b*, 30*c* and 30*d* is preferred, as this distributes the forces occurring over the profiles of the roller tracks to the structure.

Figure 6:
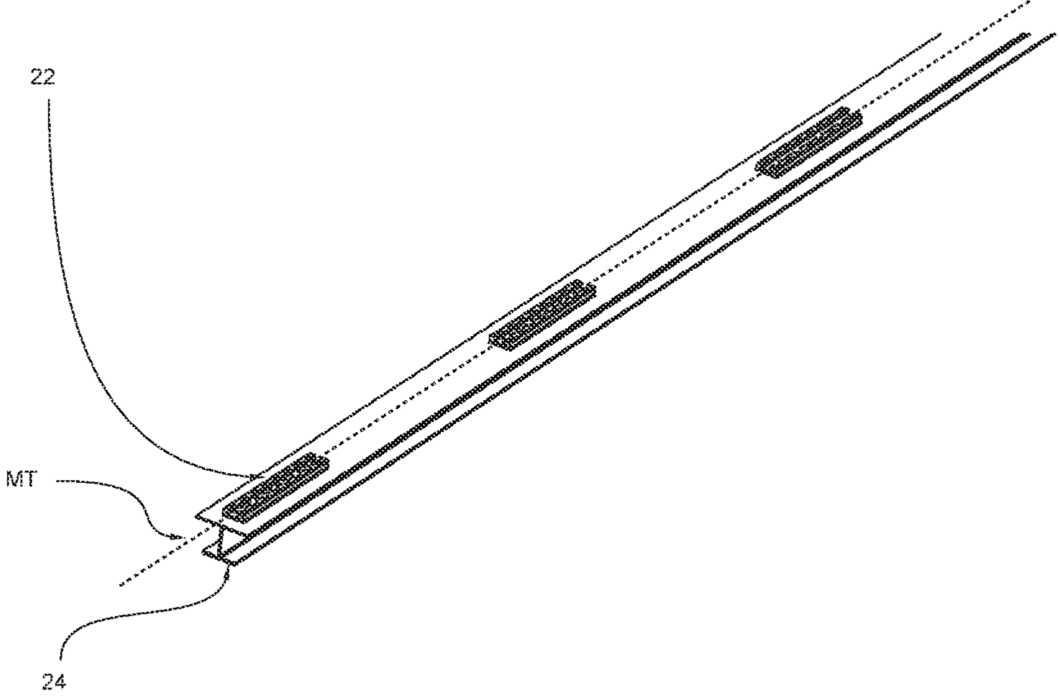
FIG. 6 shows a perspective view of a perforated rail.
Figure 7:
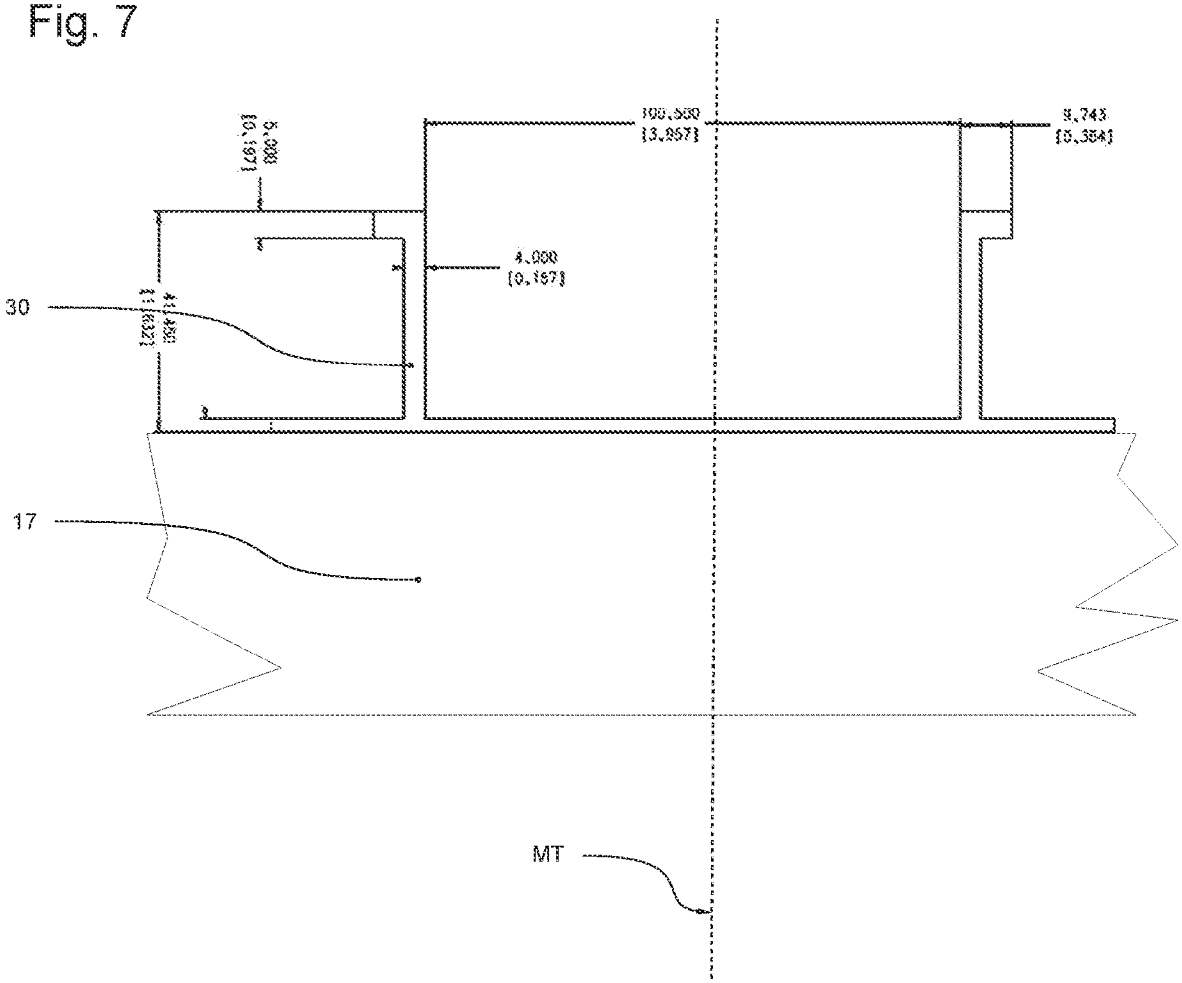
FIG. 7 shows a side view of a profiled rail of a roller track.

Immediately adjacent to the center plane ME on each side of the cargo deck 12 are the first perforated rails 20*a* and 20*a*', respectively. As can be seen from FIG. 6, this is a profiled rail 24 in the form of an I-profile, on the upper side of which perforated rail links 22 are provided spaced apart from one another. FIG. 6 also shows by means of a dashed line the mounting line MT of a corresponding perforated rail 20. This mounting line effectively extends centrally between the perforated rail links 22. In the exemplary embodiments shown, the perforated rail links are preferably arranged at regular intervals in such a way that the start of a first perforated rail link 22 is approx. 63 cm away from the start of a second perforated rail link 22 (link spacing). Corresponding distances can be provided, for example, for the perforated rail links of the second and third perforated rails 20*b*, 20*c*.

Figure 5:
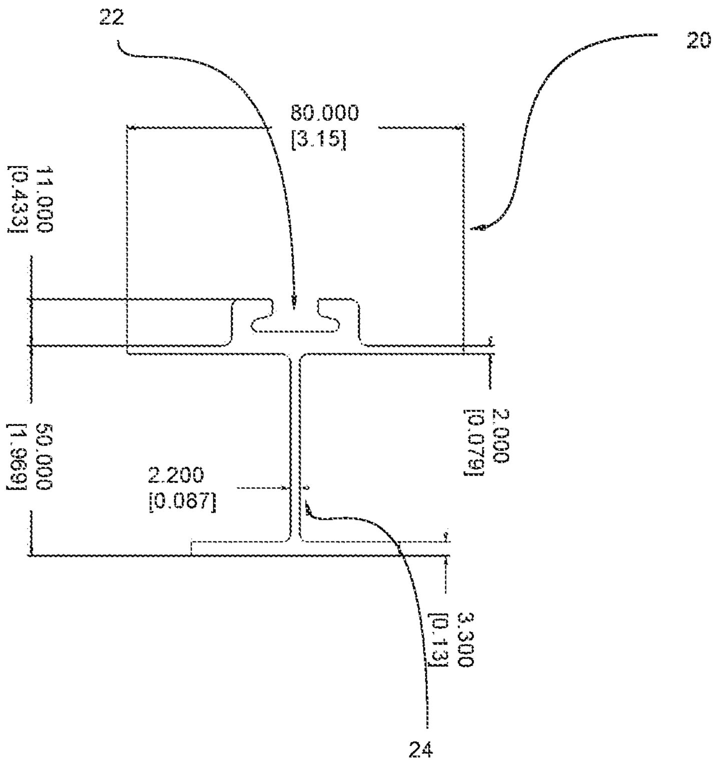
FIG. 5 shows a side view of a perforated rail.

FIG. 5 shows the perforated rail 20 with the perforated rail link 22 and the profiled rail 24.

The perforated rail link 22 is inserted into recesses provided for this purpose in the panels on the cargo deck 12 in such a way that it is accessible from the outside.

As can be seen from FIG. 4, various functional units are anchored in the perforated rail links 22. Taking the first perforated rails 20*a*, 20*a*' as an example, it can be seen that center guide locks 80, 80' are anchored in these.

In addition to the center guide locks 80, 80', other locks can also be mounted in the perforated rails, as can be seen from FIG. 4, particularly in connection with the second and third perforated rails 20*b*, 20*c*.

In addition to the perforated rails 20, fitting elements 40 are also provided on the cargo deck 12 according to the invention. In contrast to the perforated rails 20, the fitting elements 40 of the embodiment shown have no profiled rails spanning a plurality of cross members 17. The fitting elements 40 are attached directly to cross members. Due to the lack of profiled rails, they are significantly lighter, reducing the overall weight of the cargo deck 12.

As explained, the fitting elements are mounted along predetermined virtual lines. These are shown as dashed lines in FIG. 4. Specifically, there are lines for the first fitting elements 40*a*, second fitting elements 40*b*, third fitting elements 40*c* and fourth fitting elements 40*d*. At the edge portion of the cargo deck 12, it is particularly noteworthy that a side guide 100 is mounted thereon. This side guide 100 comprises a plurality of side guide frames 102, 102', 102" on which a side guide rail 104 is arranged to connect the side guide frames 102, 102', 102" to each other. Each of the side guide frames 102, 102', 102" is connected to the cargo deck 12 at three positions. These are the third fitting elements 40*c*, the perforated rail links 22 of the fourth perforated rails, and the fourth fitting elements 40*d*. The side guide rail 104 and the fourth perforated rail, together with the plurality of fastening areas, contribute significantly to the stiffening of the side guide as well as the entire cargo deck 12. The provision of additional perforated rails 20 may be omitted at this point.

Figure 8:
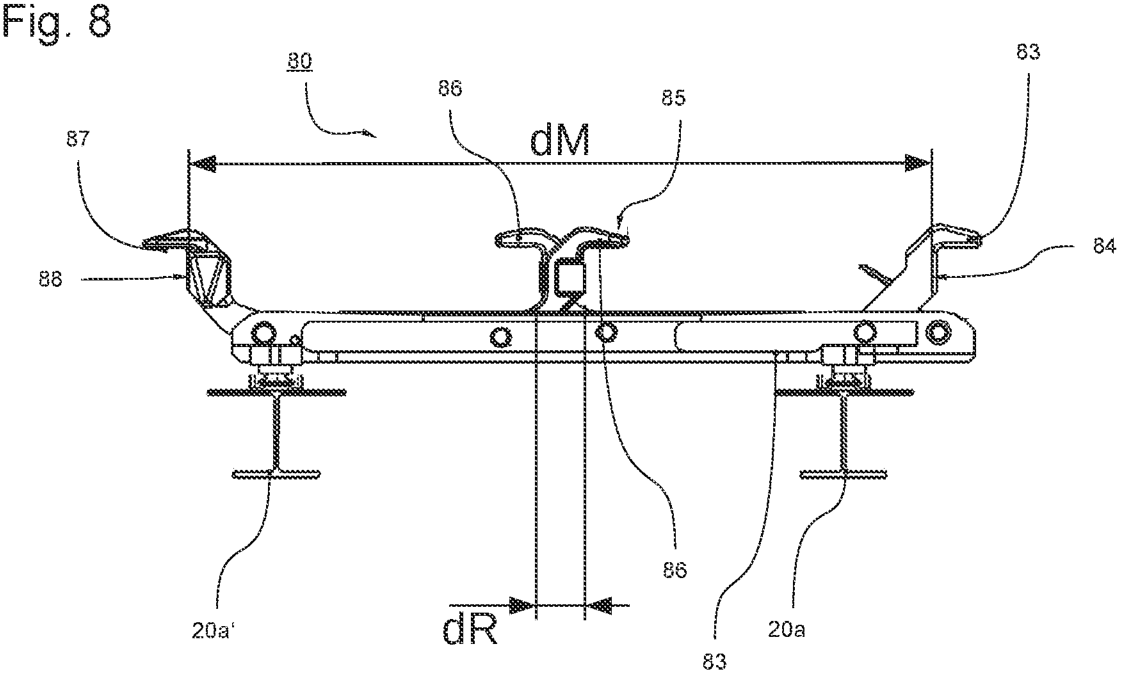
FIG. 8 shows a side view of an assembled center guide lock (lock claws folded up)
Figure 9:
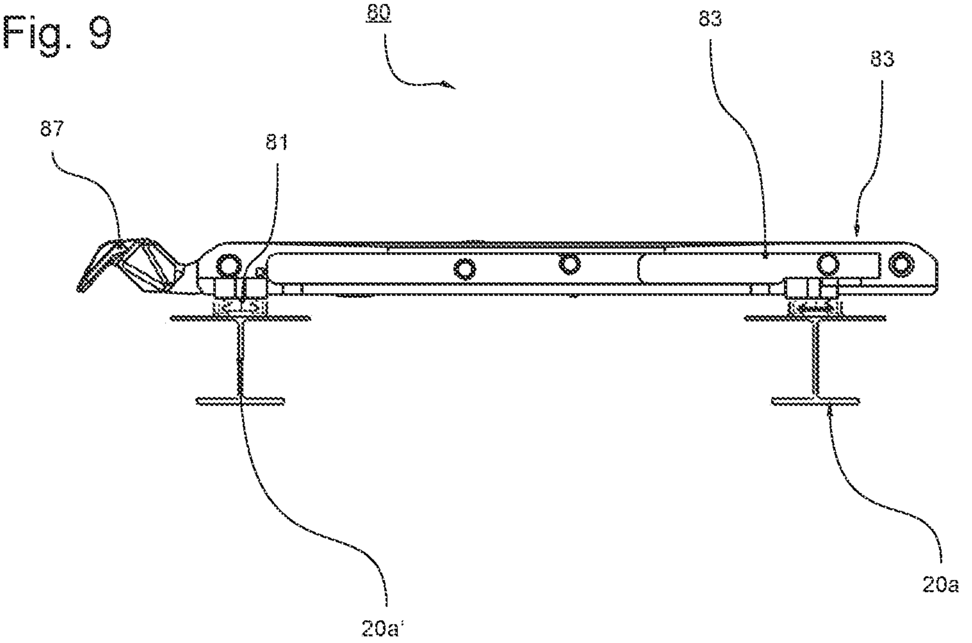
FIG. 9 shows another side view of the center guide lock according to FIG. 8 with the lock claws folded down.
Figure 10:
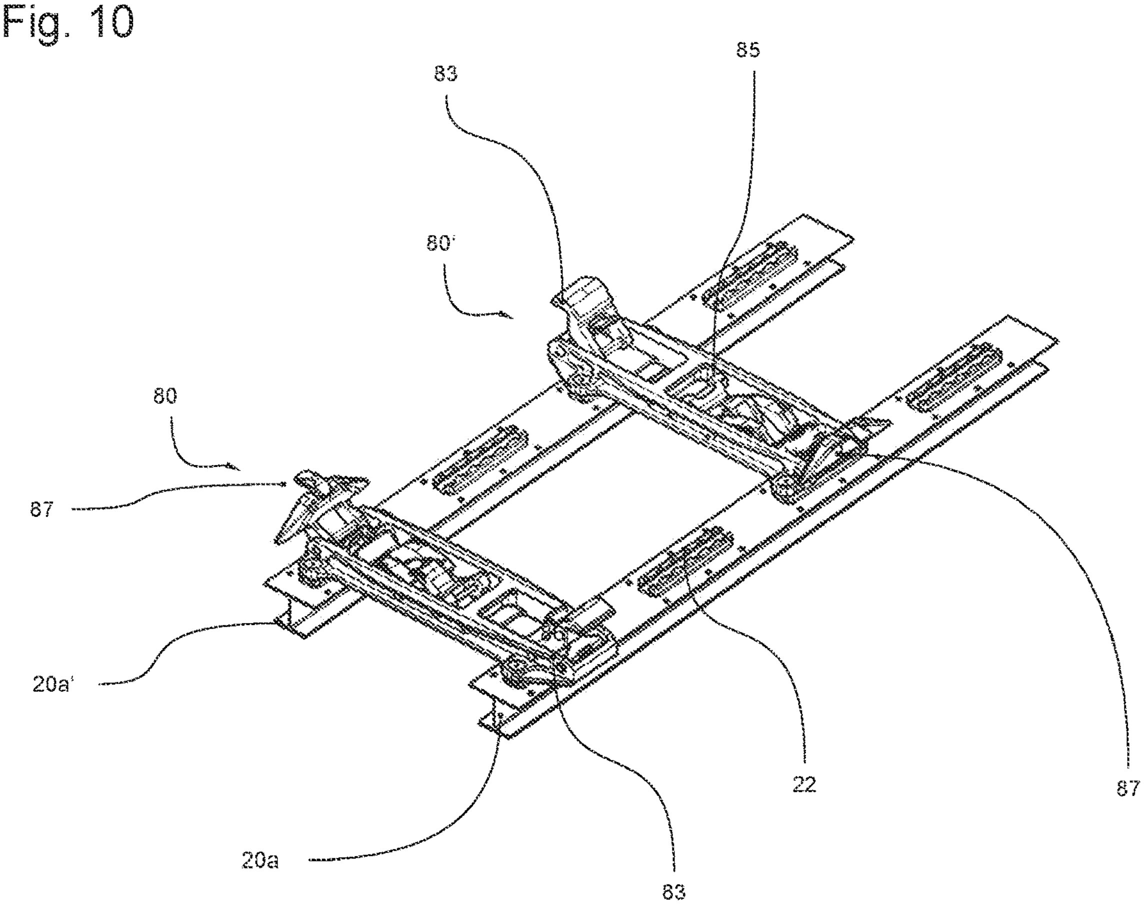
FIG. 10 shows a perspective view of center guide locks aligned in different directions.

The actual design of the center guide locks 80, 80' and their arrangement is shown in detail in FIGS. 8-10. FIG. 8 shows the center guide lock 80, which is identical in construction to the center guide lock 80', in an erected configuration. Basically, it should first be noted that the center guide lock 80 is attached to the first perforated rails 20*a*, 20*a*'. For this purpose, the center guide lock 80 comprises corresponding perforated rail inserts 81. The center guide lock 80 has a center lock frame 82. A securing claw 83 is arranged on one side and a side guide claw 87 on the other side of this center guide lock frame 82.

The side guide claw 87 is designed to guide ULDs, in particular at their lower edges, so that a conveying track for ULDs is specified by means of the side guide claw 87. The guiding takes place essentially along the stop surfaces 88. In the exemplary embodiment shown, the side guide claws 87 have wings that form ramps, so that the side guide claws 87 lower when ULDs pass over them laterally (X-direction). Preferably, the center guide locks 80 used have a mechanism that ensures that the side guide claws (87) return to a working position after they have been driven over. To accommodate Z-loads, lugs are provided which, depending on the design, can fold away sideways.

The securing claws 83 have a significantly narrower surface and, unlike the side guide claw 87, have no wings. They are dimensioned in such a way that they can engage in recesses provided for this purpose in order to secure the ULDs, in particular pallets, in the X-direction. This means that the securing claws 83 are designed to engage with stops, known as pockets, to prevent the load from slipping during flight. The securing claws 83 have stop surfaces 84.

Furthermore, the center guide lock 80 comprises a center guide claw 85 approximately in the center. This center guide claw can, in particular, guide containers and secure them in the Z-direction. The center guide claw 85 has a first stop surface 86 and a second stop surface 86'.

In one exemplary embodiment, the stop surfaces 84, 88 of the securing claw 83 and the side guide claw 87 have a distance dM of approx. 45 cm (see also FIG. 8). These claws are particularly suitable for guiding and securing pallets. If the center guide locks 80, 80' are arranged alternately as shown by way of example in FIGS. 10 and 11, this results in a center aisle between the loaded ULDs in which loading personnel can move. In this respect, it is possible to activate the securing claws 83.

The center guide claw 85 with the two stop surfaces 86, 86' can guide and fasten significantly larger ULDs. However, the maintenance aisle is omitted in a corresponding configuration. In a preferred embodiment, the center guide claw 85 has a claw diameter of approx. 2.5 cm (1 inch).

Figure 11:
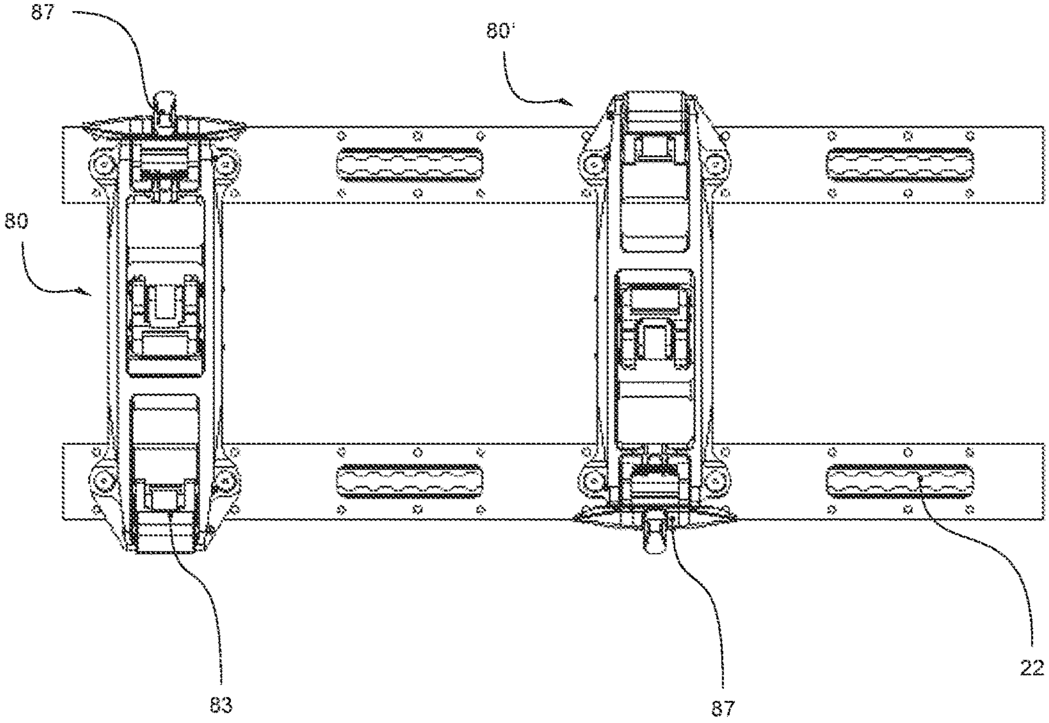
FIG. 11 shows a top view of the arrangement according to FIG. 10.

In the exemplary embodiment shown in FIGS. 10, 11, link spacings of approximately 51 cm (20.125 inches) are provided for the first perforated rails 20*a*, 20*a'*.

Figure 12:
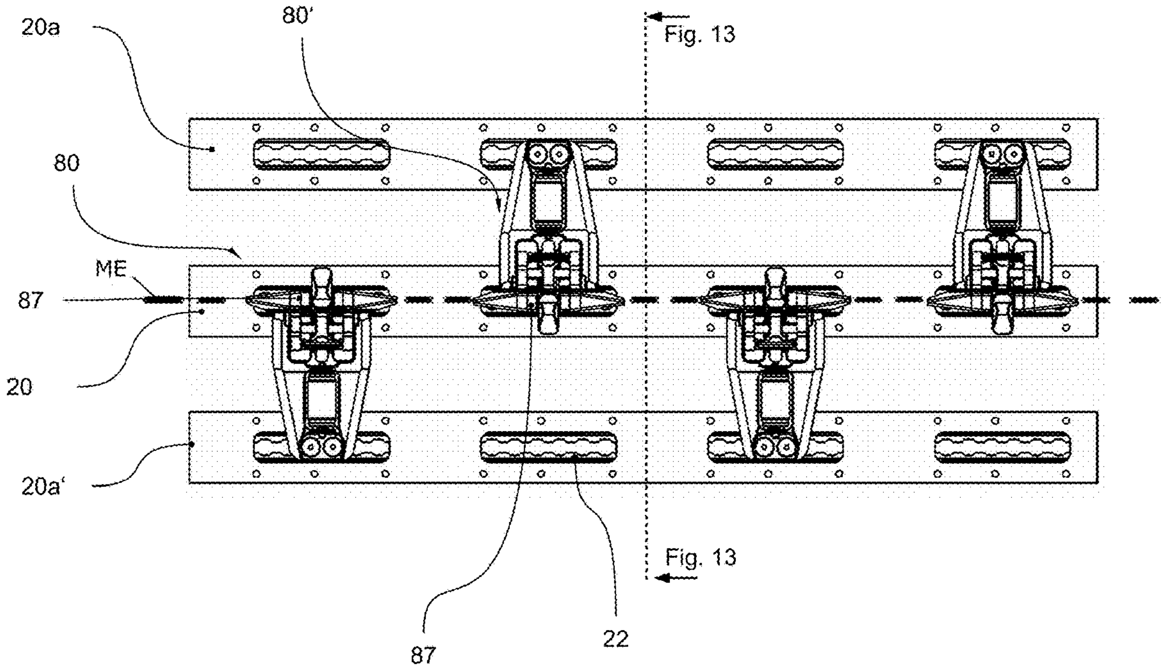
FIG. 12 shows a top view of a partial section of a further exemplary embodiment of a cargo deck according to the invention with alternative center guide locks.
Figure 13:
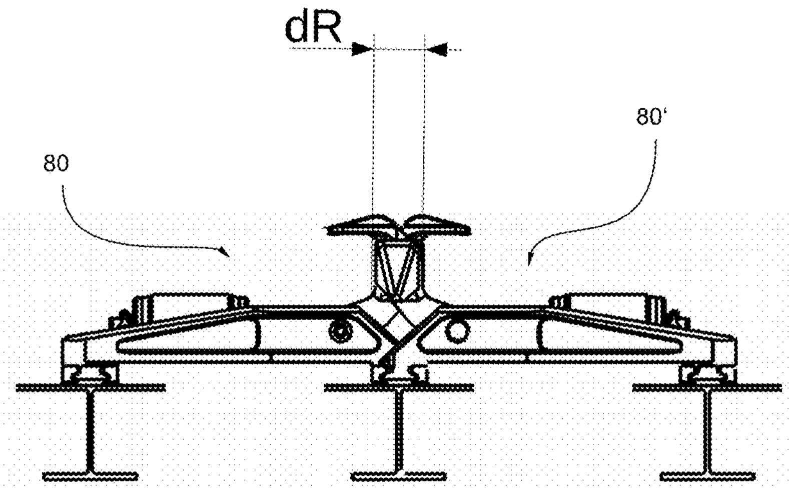
FIG. 13 shows a section through the arrangement according to FIG. 12.
Figure 14:
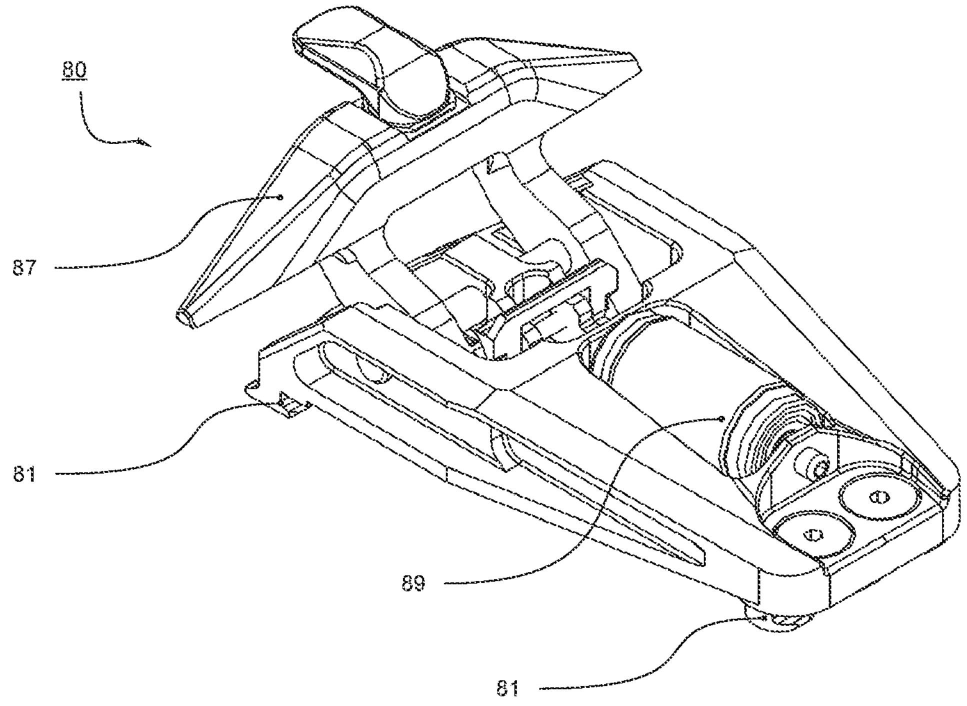
FIG. 14 shows a detailed view of the center guide lock according to FIG. 12 (lock claw folded up)
Figure 15:
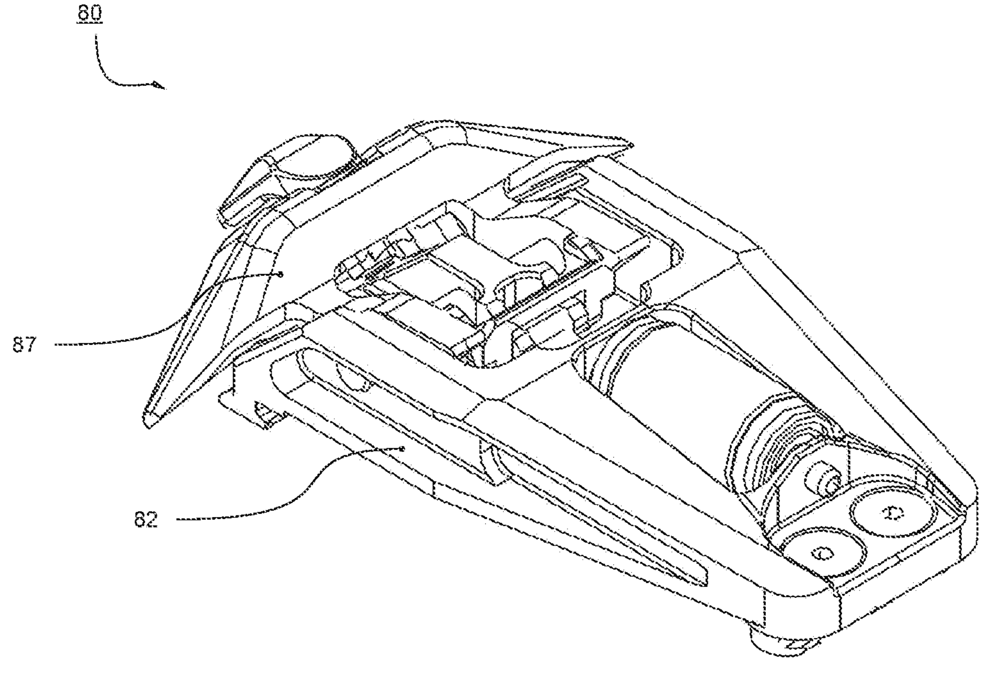
FIG. 15 shows the center guide lock from FIG. 14 with the lock claw folded down.

FIGS. 12-15 show alternative designs of the center guide locks 80, 80' as well as a correspondingly adapted cargo deck 12. First, it should be noted that for mounting the center guide locks 80, 80' as shown in FIGS. 12-15, an additional perforated rail 20 must be provided on the cargo deck 12 along the center plane ME. Thus, it is possible to mount a much shorter center guide lock 80, such as shown in detail in FIGS. 14 and 15. This alternative center guide lock 80 also has a side guide claw 87 that can be folded down and driven over. FIG. 14 shows the lock in the folded-up state, while FIG. 15 shows it in the folded-down state. To provide guidance along the center plane ME, the center guide locks 80, 80' can be arranged in different orientations as shown in FIG. 12. Furthermore, the attachment within the existing perforated rails 20, 20*a'* is varied. Thus, the center guide lock 80 is anchored in the perforated rail 20 as well as in the first perforated rail 20*a'*. The center guide lock 80' is anchored in the first perforated rail 20*a* and the center perforated rail 20.

In the exemplary embodiment shown in FIGS. 12 and 13, link spacings of approx. 25 cm (20.0625 inches), particularly 25.5 cm (20.0625 inches), are provided for the first perforated rails 20*a* so that a pair of lugs (starboard or port) of the side guide claws 87 pointing in the same direction have a spacing of approx. 51 cm (20.125 inches) to accommodate sufficient loads in the Z-direction.

The side guide claws 87 of the individual locks are all more or less in line. Due to the special arrangement, as shown in FIG. 13, two guide planes can be spanned which run directly adjacent to each other. Their distance can amount, for example, to the already indicated claw diameter dR of approx. 2.5 cm. At the same time, however, the special mutual arrangement makes it possible to absorb a particularly large number of forces.

Theoretically, it is possible to mount the locks in an inverted position to hold and support ULDs with smaller dimensions.

Figure 16:
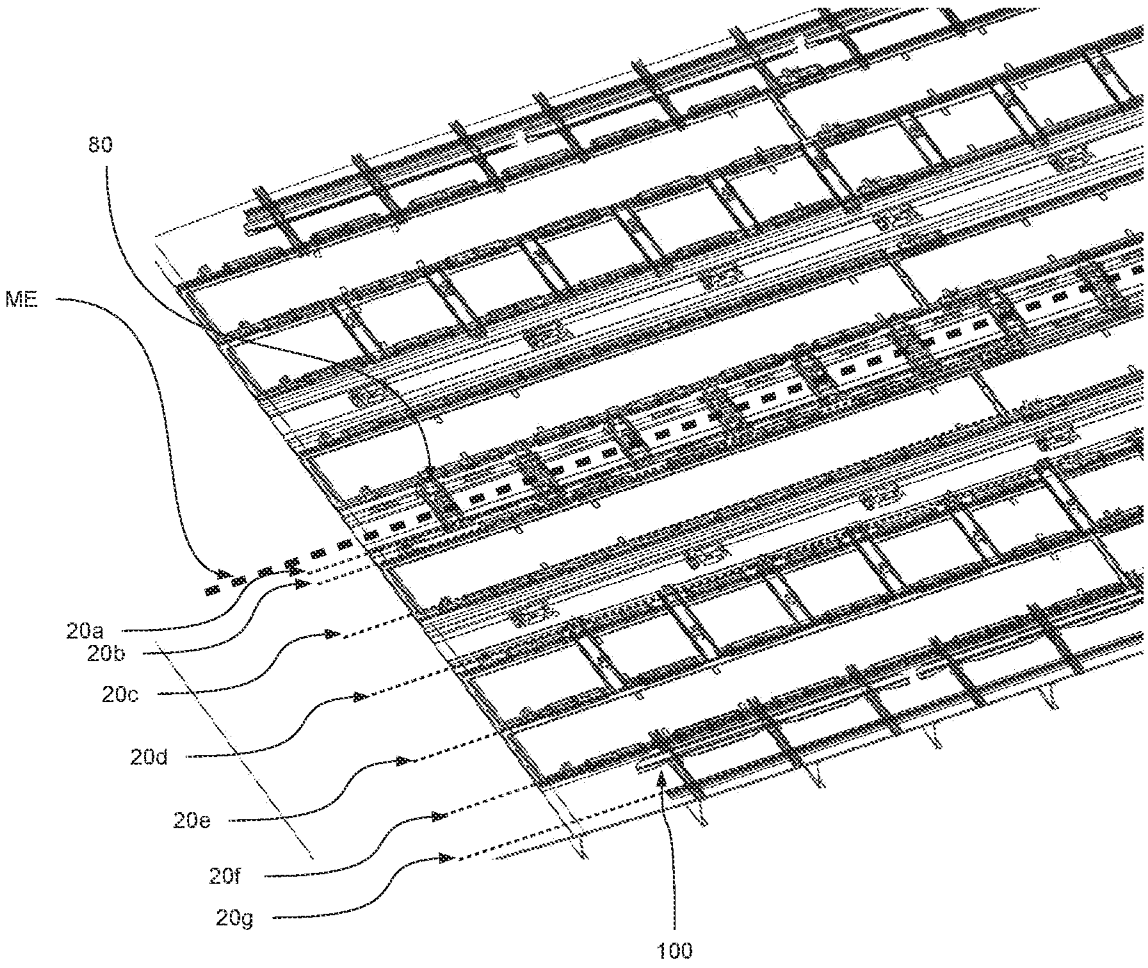
FIG. 16 shows another exemplary embodiment of a cargo deck according to the invention.

FIG. 16 shows another cargo deck 12 according to the invention. Here, a higher number of perforated rails 20 are provided instead of the roller tracks 30 which are firmly connected to the cross members 17. Ultimately, this allows the complete cargo deck 12 to be redesigned. The roller tracks 30 are also provided in a removable embodiment, wherein these can also be connected to the cargo deck via the perforated rails 20.

In the configuration shown, seven perforated rails 20*a*, 20*b*, 20*c*, 20*d*, 20*e*, 20*f*, 20*g* are provided on each side of the cargo deck. Also, the arrangements of these perforated rails 20*a*-20*g* are symmetrical with respect to the center plane ME.

Center guide locks 80, 80', as already explained in connection with FIGS. 8-11, can also be used on cargo deck 12 as shown in FIG. 16. Here, too, the advantages already explained with reference to these figures arise. In particular, the center guide locks 80, 80' can be oriented in different directions to perform a variety of functions at different positions of the cargo deck 12.

In an exemplary embodiment of the cargo deck 12 according to FIG. 16, a similar side guide 100 is also provided as already described in connection with FIG. 4. However, in contrast to the exemplary embodiment according to FIG. 4, the side guide frames 102, 102', 102" are anchored in the perforated rails 20*f* and 20*g*. Thus, a fixation to two perforated rails 20*f*, 20*g* takes place.

In the exemplary embodiment shown in FIG. 12, link spacings of approximately 51 cm (20.125 inches) are provided for the first perforated rails 20*a*, 20*a'*. Continuous perforated rail links 22 may be provided for the remaining perforated rails 20*b* through 20*g*. In one exemplary embodiment, the outer perforated rails, in particular the sixth perforated rails 20*f* and/or the seventh perforated rails 20*g* have a link spacing of approx. 50 to 55, in particular approx. 52 cm.

In the exemplary embodiment shown in FIGS. 12 and 16, link spacings of approx. 25 cm (20.0625 inches), particularly 25.5 cm (20.0625 inches), are provided for the first perforated rails 20*a* so that a pair of lugs (starboard or port) of the side guide claws 87 facing in the same direction have a spacing of approx. 51 cm (20.125 inches) to accommodate sufficient loads in the Z-direction.

In a preferred exemplary embodiment shown in FIG. 12, the perforated rails 20 are arranged at the following positions starting from the center plane ME:

First perforated rail 20*a*: approx. 21-25 cm, in particular approx. 21.5-23.5 cm;

Second perforated rail 20*b*: approx. 70-77 cm;

Third perforated rail 20*c*: approx. 123 cm;

Fourth perforated rail 20*d*: approx. 173-178 cm, especially approx. 173 cm;

Fifth perforated rail 20*e*: approx. 222-227 cm, especially ca. 224 cm;

Sixth perforated rail 20*f*: approx. 248-259 cm;

Seventh perforated rail 20*g*: approx. 275 cm.

Figure 17:
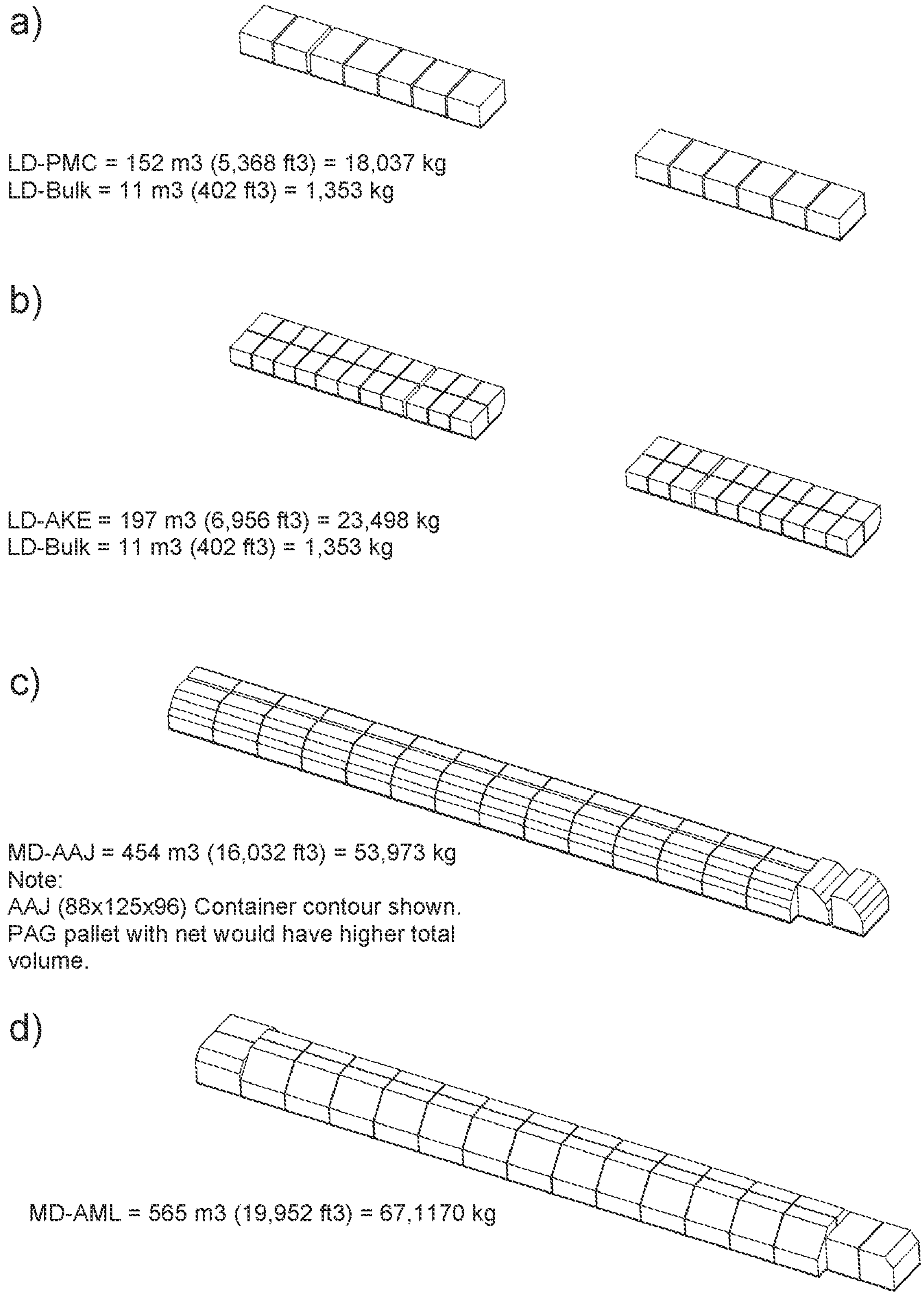
FIG. 17 shows exemplary loading configurations for a cargo deck according to the invention.
Figure 17:
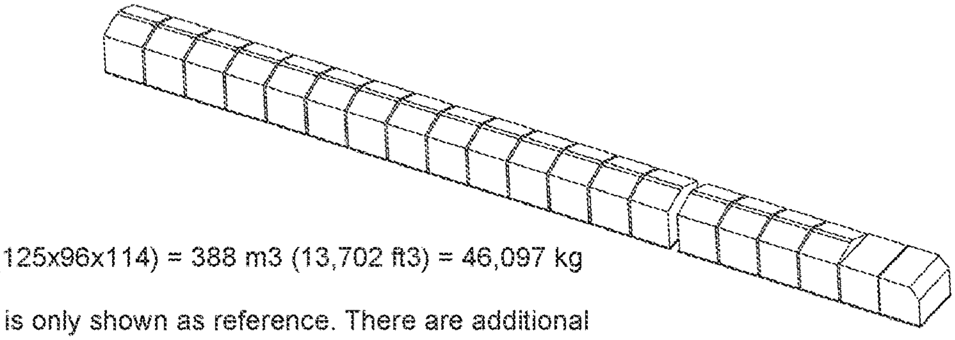
Figure 17:
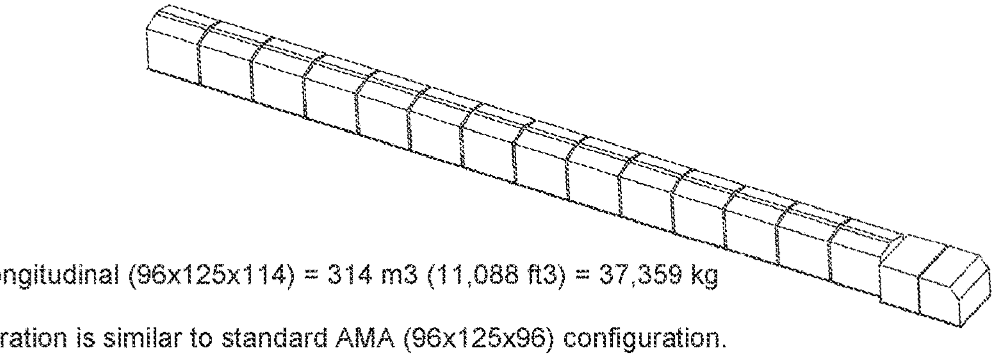
Figure 17:
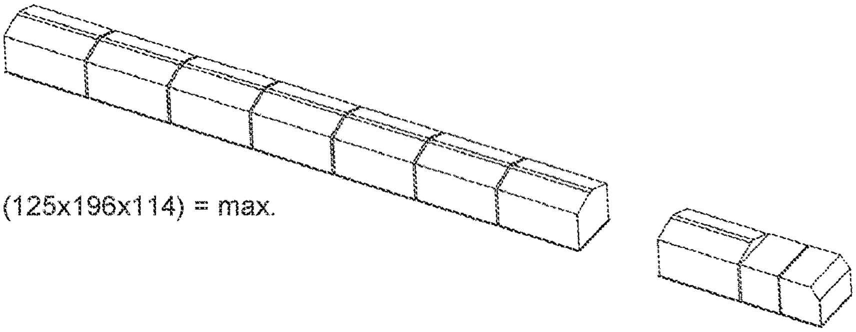

FIG. 17 shows different loading configurations that can be implemented by means of the cargo deck according to the invention. Depending on the length of the aircraft 10, the number of containers or pallets to be accommodated can vary. Crucial to the invention are the multitude of loading configurations, some of which can be combined. By way of example, some possible loading configurations are given below:

30 AMJ containers;

30 AAJ containers (example c);

30 AMC containers;

26 AML containers and 3 AMJ containers (example d);

30 PMC pallets (loaded crosswise) (example e);

26 PMC pallets (loaded lengthwise).

In some of the described exemplary embodiments, in particular in the exemplary embodiment according to FIG. 4, the roller tracks 30 are firmly bolted to the supporting structures, in particular the cross members 17. In one exemplary embodiment, the roller tracks 30 can be easily disassembled, for example, in case of maintenance. Simple floor fittings can be used for this purpose. Alternatively, the roller tracks 30 can be seated on thin sheets (aluminum or composite) that have the function of sealing sheets. A detachable screw connection can then be made to the sheets, e.g. using rivet nuts.

The roller tracks 30 may have as lengths multiples of the common frame or frame spacings. Preferred are multiples of approx. 51 cm (20 inches), approx. 53 cm (21 inches), approx. 56 cm (22 inches), or approx. 63.5 cm (25 inches). Preferably, roller tracks 30 having a minimum length equal to five or six times the frame spacing are used. In one exemplary embodiment, the roller tracks are no longer than 7 m (23 ft), in particular no longer than 6.6 m (20 ft). For example, they may have a length between 5 and 6.5 m.

The roller tracks 30 described (cf. in particular FIG. 7) are of integral design and can be manufactured, for example, by extrusion. However, it is possible according to the invention to use multi-part roller tracks, e.g. with screw-on side cheeks.

In the exemplary embodiments, the configurations of the cargo deck 12 are partially described as symmetrical or substantially symmetrical. This preferably refers only to the mounting lines (MT) of the individual components.

The center plane (ME) was provided as the symmetry plane. This can extend centrally along the X-direction of the aircraft. However, it is also conceivable to design the cargo deck 12 in such a way that, with regard to the specified distances, it relates to a plane which is offset relative to the center plane (ME), e.g. by 1 to 10 cm.

At this point, it should be pointed out that all parts described above are to be regarded individually—even without features additionally described in the respective context, even if these have not been explicitly identified individually as optional features in the respective context, e.g. by using: in particular, preferably, for example, e.g., optionally, round brackets, etc.—and in combination or any sub-combination as independent designs or further developments of the invention as defined in particular in the introduction to the description. Deviations therefrom are possible. Specifically, it should be noted that the word in particular or round brackets do not indicate any features that are mandatory in the respective context.

LIST OF REFERENCE SIGNS

10 Aircraft
11 Fuselage
12 Upper deck/cargo deck
13 Lower deck
14 Floor
17 Cross member
18 Nose
19 Tail
20, 20*a*,20*a*', 20*b*, 20*c*, 20*d*, 20*e*, 20*f*, 20*g* Perforated rail
22 Perforated rail link
24 Profiled rail
30, 30*a*, 30*b*, 30*c*, 30*d* Roller track
40, 40*a*, 40*b*, 40*c*, 40*d* Fitting element
42 Fitting perforated rail link
80, 80' Center guide lock
81 Perforated rail insert
82 Center lock frame
83 Securing claw
84 Stop surface of the securing claw
85 Center guide claw
86, 86' Stop surfaces of the center guide claw
87 Side guide claw
88 Stop surface of the side guide claw
89 Roller
100 Side guide
102, 102', 102" Side guide frame
104 Side guide rail
ME Center plane
MT Mounting line/mounting plane
dM Claw distance
dR Claw diameter
X, Y, Z X-direction, Y-direction, Z-direction

The invention claimed is:

1. A cargo deck for an aircraft having a center plane extending centrally along a longitudinal X direction of the cargo deck, the cargo deck extending along the X direction and a transverse Y direction perpendicular to the X direction, the cargo deck comprising:

first perforated rails arranged parallel to the center plane and spaced apart from the center plane in a range between 10 and 20 cm; and a first center guide lock and a second center guide lock, each center guide lock comprising a frame extending in a longitudinal frame direction, a side guide claw on a first end of the frame including a stop surface, and a securing claw on a second end of the frame opposite the first end, wherein the first and the second center guide locks are each formed asymmetrically with respect to a transverse plane perpendicular to the longitudinal frame direction of the frame, wherein the first and the second center guide locks are each anchored in at least one of the first perforated rails, and wherein the first and the second center guide locks are spaced apart along the longitudinal X direction of the cargo deck and arranged alternately transversely on the cargo deck along the Y direction such that the stop surface of the side guide claw of the first guide lock and the stop surface of the side guide claw of the second center guide lock face in opposite directions, wherein each of the securing claws and each of the side guide claws are foldable from a working position to a rest position, wherein, in the rest position, the side guide claws extend at least partially out from the frame, wherein, in the rest position, the securing claws are arranged in an area inside the frame, wherein each side guide claw further comprises a lug mounted in a rotatably movable manner with respect to the stop surface in such a way that it folds away from an initial position to a guide position in response to cargo items passing by the side guide claw to allow the cargo items to be guided along the stop surface in the X direction, wherein, in the working position, the lugs are configured to engage cargo items to accommodate loads in a Z direction perpendicular to the X and Y directions, wherein, in the working position, the stop surfaces are configured to engage cargo items to accommodate loads in the Y direction, and wherein each of the securing claws is configured to engage cargo items to accommodate loads in the X direction.

2. The cargo deck according to claim 1, further comprising a pair of second perforated rails and a pair of third perforated rails, and wherein the first perforated rails, the pair of second perforated rails, and the pair of third perforated rails are provided in a segment of the cargo deck.

3. The cargo deck according to claim 1, further comprising:

at least one first roller track arranged parallel to the center plane and spaced apart from the center plane in a range between 44 and 57 cm; and/or at least one second roller track arranged parallel to the center plane and spaced apart from the center plane in a range between 95 and 110 cm; and/or at least one third roller track arranged parallel to the center plane and spaced apart from the center plane in a range between 145 and 160 cm; and/or at least one fourth roller track arranged parallel to the center plane and spaced apart from the center plane in a range between 200 and 210 cm.

4. The cargo deck according to claim 3, wherein exactly 8 or 9 perforated rails and/or exactly 8 roller tracks are arranged in a segment of the cargo deck.

5. The cargo deck according to claim 3, further comprising:

fitting elements mounted or mountable on cross members of the aircraft and having a perforated rail link, comprising:

at least one first fitting element mounted at a distance of between 155 and 165 cm from the center plane; and/or at least one second fitting element mounted at a distance of between 163 and 175 cm from the center plane; and/or at least one third fitting element mounted at a distance of between 225 and 240 cm from the center plane; and/or at least one fourth fitting element mounted at a distance of between 260 and 280 cm from the center plane.

6. The cargo deck according to claim 5, further comprising a pair of fourth perforated rails, wherein the third and fourth fitting elements are arranged alternately to one of the fourth perforated rails, wherein at least one side guide is fixed to each of the pair of fitting elements and to the fourth perforated rail.

7. The cargo deck according to claim 5, wherein:

in at least one segment, a pair of first, second, third and fourth roller tracks are each arranged symmetrically with respect to the center plane; and/or in at least one segment, a pair of first, second, third and fourth perforated rails are each arranged symmetrically with respect to the center plane; and/or in at least one segment, a pair of first or second or third or fourth fitting elements are each arranged symmetrically with respect to the center plane.

8. The cargo deck according to claim 1, wherein the center guide locks are each anchored in two first perforated rails.

9. The cargo deck according to claim 1, wherein the center guide locks are formed and arranged or arrangeable at least in one segment in such a way that the stop surfaces of the side guide claws in one configuration and/or arrangement delimit a center aisle, wherein the stop surfaces of the side guide claws in this configuration or arrangement are spaced at least 15 cm from the center plane.

10. The cargo deck according to claim 1, wherein at least one of the center guide locks comprises a center guide claw having two alternating stop surfaces, wherein a stop surface of the side guide claw in an erected position is oriented in an opposite direction to a stop surface of the securing claw.

11. An aircraft having a cargo deck according to claim 1.

12. The cargo deck according to claim 1, wherein each of the first and second center guide locks further comprises:

a center guide claw mounted in the frame and having a first stop surface and a second stop surface which are aligned in opposite directions and are spaced apart;

wherein the stop surfaces of the side guide claws and stop surfaces of the securing claws are spaced apart from each other in an erected position by at least 30 cm and are oriented in opposite directions.

13. The center guide lock according to claim 12, wherein the center guide claw is arranged in such a way that in an erected position the stop surface of the securing claw is spaced from the first stop surface of the center guide claw by a first distance, the stop surface of the side guide claw is spaced from the second stop surface of the center guide claw by a second distance, and the first and second distances are the same.

14. A cargo deck for an aircraft having a center plane extending centrally along a longitudinal X direction of the cargo deck, the cargo deck extending along the X direction and a transverse Y direction perpendicular to the X direction, the cargo deck comprising:

first perforated rails arranged parallel to the center plane and spaced apart from the center plane in a range between 10 and 20 cm;

a perforated center rail arranged along the center plane; and first center guide locks and second center guide locks, each of the first and second center guide locks comprising a frame extending in a longitudinal frame direction and just one side guide claw including a stop surface for guiding cargo items, the side guide claw arranged on a first end of the frame, wherein each side guide claw further comprises a lug mounted in a rotatably movable manner with respect to the stop surface in such a way that it folds away from an initial position to a guide position in response to cargo items passing by the side guide claw to allow the cargo items to be guided along the stop surface in the X direction, wherein the lugs are configured to engage cargo items to accommodate loads in a Z direction perpendicular to the X and Y directions, wherein each of the first and second center guide locks are anchored in the perforated center rail in one of the first perforated rails, wherein the first center guide locks and the second center guide locks are arranged such that the stop surfaces of the first center guide locks face in an opposite direction than the stop surfaces of the second center guide locks, wherein the stop surfaces of the first center guide locks define a first guide plane and the stop surfaces of the second center guide locks define a second guide plane, and wherein the side guide claws of the first center guide locks and the side guide claws of the second center guide locks are formed and arranged such that the first and the second guide planes are spaced apart by less than 5 cm.

* * * * *